US012790898B2

(12) United States Patent
Kuckes et al.

(10) Patent No.: US 12,790,898 B2
(45) Date of Patent: Nov. 10, 2026

(54) DOWNHOLE ASSEMBLY WITH PNEUMATIC ISOLATION

(71) Applicant: Vector Magnetics, LLC, Ithaca, NY (US)

(72) Inventors: Arthur F. Kuckes, Ithaca, NY (US); Morgan Thompson, Ithaca, NY (US)

(73) Assignee: Vector Magnetics, LLC, Ithaca, NY (US)

( * ) Notice: Subject to any disclaimer, the term of this patent is extended or adjusted under 35 U.S.C. 154(b) by 300 days.

(21) Appl. No.: 18/553,582

(22) PCT Filed: Apr. 29, 2021

(86) PCT No.: PCT/US2021/029934
§ 371 (c)(1),
(2) Date: Oct. 2, 2023

(87) PCT Pub. No.: WO2022/231596
PCT Pub. Date: Nov. 3, 2022

(65) Prior Publication Data

US 2024/0183225 A1 Jun. 6, 2024

(51) Int. Cl.
*E21B 7/04* (2006.01)
*E21B 17/07* (2006.01)
(Continued)

(52) U.S. Cl.
CPC .............. *E21B 7/046* (2013.01); *E21B 17/07* (2013.01); *E21B 47/017* (2020.05); (Continued)

(58) Field of Classification Search
CPC .... E21B 7/046; E21B 47/017; E21B 47/0228; E21B 17/07; E21B 47/024
See application file for complete search history.

(56) References Cited

U.S. PATENT DOCUMENTS 4,276,947 A * 7/1981 Hebel ........................ F16F 1/32 175/321
4,844,157 A * 7/1989 Taylor ...................... E21B 17/07 166/178

(Continued)

FOREIGN PATENT DOCUMENTS

EP 2715030 A1 4/2014
EP 2715030 B1 * 4/2018 ........... E21B 43/003

OTHER PUBLICATIONS

International Search Report and Written Opinion, Application No. PCT/US2021 /029934, prepared Dec. 8, 2021, entire document.

*Primary Examiner* — Neel Girish Patel
(74) *Attorney, Agent, or Firm* — Bond, Schoeneck & King, PLLC; Frederick J.M. Price

(57) ABSTRACT

The present invention is directed to an apparatus for use on a structural member having a longitudinal axis. The structural member conducts a pressurized fluid in an operational state. The apparatus includes a housing member having a first end, a second end, and at least one protective enclosure configured to accommodate at least one device. The housing member moves on the structural member parallel to the longitudinal axis in the operational state with a substantially frictionless reciprocating motion. The housing member is rotationally registered to the structural member when coupled thereto. A first pneumatic isolator is formed at the first end and receives a first pressurized fluid portion of the pressurized fluid in the operational state to thus drive the housing member toward a second direction of the substantially frictionless reciprocating motion. A second pneumatic isolator is formed at the second end and receives a second pressurized fluid portion of the pressurized fluid in the operational state to thus drive the housing member toward a first direction of the substantially frictionless reciprocating motion opposite the second direction. The substantially (Continued)

frictionless reciprocating motion is a function of external stimuli, the first pressurized fluid portion and the second pressurized fluid portion such that the housing member is substantially isolated from the external stimuli.

25 Claims, 13 Drawing Sheets

(51) Int. Cl.

| | |
|---|---|
| ***E21B 47/017*** | (2012.01) |
| ***E21B 47/0228*** | (2012.01) |
| ***E21B 47/024*** | (2006.01) |
| ***F16F 15/02*** | (2006.01) |

(52) U.S. Cl.

CPC ........ *E21B 47/0228* (2020.05); *E21B 47/024* (2013.01); *F16F 15/02* (2013.01)

(56) References Cited

U.S. PATENT DOCUMENTS

| | | | | |
|---|---|---|---|---|
| 5,589,775 | A * | 12/1996 | Kuckes | E21B 47/0228<br>175/45 |
| 10,982,492 | B1 * | 4/2021 | Gopalan | E21B 17/07 |
| 2007/0278008 | A1 * | 12/2007 | Kuckes | E21B 47/0228<br>175/45 |
| 2010/0155138 | A1 * | 6/2010 | Kuckes | E21B 47/022<br>175/45 |
| 2011/0198126 | A1 * | 8/2011 | Swietlik | E21B 17/07<br>175/320 |
| 2012/0228028 | A1 * | 9/2012 | Turner | E21B 44/00<br>175/56 |
| 2015/0376959 | A1 * | 12/2015 | Dinica | E21B 17/07<br>175/56 |
| 2016/0281431 | A1 * | 9/2016 | Peters | E21B 47/024 |
| 2017/0356249 | A1 * | 12/2017 | Pelfrene | E21B 17/042 |
| 2023/0160267 | A1 * | 5/2023 | Falahati | E21B 17/07<br>464/20 |

* cited by examiner

DOWNHOLE ASSEMBLY WITH PNEUMATIC ISOLATION

BACKGROUND OF THE INVENTION

1. Field of the Invention

The present invention relates generally to an apparatus and method for drilling boreholes, and particularly to a downhole assembly and method for generating rotating magnetic fields or sensing magnetic fields (or other such parameters) used for guiding directional drilling of a borehole.

2. Technical Background

In underground drilling operations such as oil and gas drilling operations, it is often desirable to precisely control the drilling path of a new borehole relative to a known location (which may be disposed within the pathway of an existing borehole). To do that, operators may precisely monitor the location of the drill bit forming the new borehole relative to the existing borehole. For example, when a group of wells are drilled from an offshore platform, it is often necessary to drill new wells spaced three meters or less from existing wells for 300 meters or more during the initial depth interval. Subsequently, the wells may be directionally deviated and drilled to targets which may be two kilometers or more away in lateral directions. In another example application, this procedure may be useful when twin horizontal wells are drilled for the steam-assisted gravity drainage (SAGD) of heavy oils. In this example, it may be necessary to drill one well directly above the other while maintaining a five meter (±2 meter) spacing over 500 meters of horizontal extension at depths of 500 or more meters. For example, the present invention may be employed in various types of underground drilling operations such as geothermal drilling, mining, hammer drilling and/or other such drilling operations. The present invention should not be deemed to be limited to the aforementioned examples.

The monitoring system used to control the drilling operations can include a magnetic field sensor that is disposed in the existing borehole and a magnetic source that is disposed in the new borehole. Specifically, the magnetic source assembly may be disposed in a drill string proximate the drill bit/tool. The magnetic source generates rotating magnetic fields perpendicular to the axis of rotation. The sensor apparatus typically includes a magnetometer assembly that is configured to measure the magnetic field radiating from the magnetic source assembly to precisely measure the location of the source. In this way, the drilling of the new borehole may be precisely controlled to achieve a desired separation between the existing borehole and the new borehole.

One issue that may be associated with a magnetic source assembly or a sensor assembly relates to their sensitivity to stress waves or thermal energy (heat). Briefly stated, the drilling process may generate stress waves and vibrational forces which propagate down the drill string to the magnetic source or sensor assembly. The stress waves may cause the magnetic source assembly or the sensor assembly to fail. The heat may be generated from various sources. Those skilled in the drilling/mining arts will appreciate that a drill bit may become relatively hot during mining and drilling operations. The thermal energy tends to cause the epoxy (and/or other potting compounds) used to secure the magnetic sources to the source assembly housing to be compromised or to fail entirely. As a result, the magnetic source elements may become loose or may begin to separate from the housing. Moreover, magnetic materials may lose their magnetic remanence if temperatures exceed the temperature rating of the magnetic material.

Another issue relates to rotationally registering the magnetic source assembly or the sensor assembly to the drill bit. Rotational registration allows the monitoring system to determine the orientation of the drill bit, as well the location of the drill bit, to more effectively control the drilling process.

SUMMARY OF THE INVENTION

The present invention substantially addresses the needs described above by providing an apparatus and method configured to substantially isolate a downhole assembly from the stress waves or thermal energy experienced during drilling operations. The present invention is also configured to rotationally register a downhole assembly to a drill bit to thus provide drill bit orientation data during the drilling control operation.

One aspect of the present invention is directed to an apparatus for use on a structural member having a longitudinal axis. The structural member is configured to conduct a pressurized fluid in an operational state. The apparatus comprises a housing member including a first end, a second end, and at least one protective enclosure configured to accommodate at least one device. The housing member is configured to move on the structural member parallel to the longitudinal axis in the operational state with a substantially frictionless reciprocating motion. The housing member is configured to be rotationally registered to the structural member. A first pneumatic isolator is formed at the first end and configured to receive a first pressurized fluid portion of the pressurized fluid in the operational state to thus drive the housing member toward a second direction of the substantially frictionless reciprocating motion. A second pneumatic isolator is formed at the second end and configured to receive a second pressurized fluid portion of the pressurized fluid in the operational state to thus drive the housing member toward a first direction of the substantially frictionless reciprocating motion opposite the second direction. The substantially frictionless reciprocating motion is a function of external stimuli: the first pressurized fluid portion and the second pressurized fluid portion such that the housing member is substantially isolated from the external stimuli.

In one embodiment, the at least one device includes at least one sensor device or at least one magnetic source element.

In one version of the embodiment, the at least one sensor device includes at least one accelerometer, a gyro sensor, a piezoelectric transducer, or a battery device.

In one embodiment, the at least one protective enclosure includes at least one set of pockets orientated in a plane perpendicular to the longitudinal axis, and wherein each pocket of the at least one set of pockets is configured to accommodate a magnetic source element.

In one embodiment, the pressurized fluid is a gas or a liquid.

In one embodiment, the structural member is a drill rod or a drill rod attachment.

In one embodiment, the external stress stimuli include stress waves, vibrations or thermal energy applied to the structural member.

In one embodiment, the pressurized fluid has a predetermined fluid pressure, the first pressurized fluid portion has a first variable fluid pressure, and the second pressurized fluid portion has a second variable fluid pressure, a sum of the first variable fluid pressure and the second variable fluid pressure being approximately equal to the predetermined fluid pressure.

In another aspect, the present invention is directed to an assembly that includes a structural member that has a longitudinal axis and is configured to conduct a pressurized fluid in an operational state. The assembly also includes an apparatus comprising a housing member including a first end, a second end, and at least one protective enclosure configured to accommodate at least one device. The housing member is configured to move on the structural member parallel to the longitudinal axis in the operational state with a substantially frictionless reciprocating motion. The housing member is rotationally registered to the structural member. A first pneumatic isolator is formed at the first end, a first pressurized fluid portion of the pressurized fluid being applied to the first pneumatic isolator in the operational state to drive the housing member toward a second direction of the reciprocating motion. A second pneumatic isolator is formed at the second end, a second pressurized fluid portion of the pressurized fluid being applied to the second pneumatic isolator in the operational state to drive the housing member toward a first direction of the reciprocating motion opposite the second direction, the substantially frictionless reciprocating motion being a function of external stimuli, the first pressurized fluid portion and the second pressurized fluid portion, wherein the housing member is substantially isolated from the external stimuli.

In one embodiment, the structural member includes a carrying region, a first shoulder member disposed at a first end portion of the carrying region and a second shoulder member disposed at a second end portion of the carrying region, wherein the housing member is coupled to the carrying region between the first shoulder member and the second shoulder member.

In one version of the embodiment, the structural member further comprises a box portion disposed at a first end of the structural member, a pin portion disposed at a second end of the structural member, and a carrying region being disposed between the box portion and the pin portion, the box portion being configured to accommodate a drive element of a drill string and the pin portion being configured to accommodate a tool bit or a drill bit.

In one embodiment, the structural member includes a first plurality of openings configured to provide the first pressurized fluid portion and a second plurality of openings configured to provide a second pressurized fluid portion.

In one version of the embodiment, the first plurality of openings are configured to direct the first pressurized fluid portion into the first pneumatic isolator and the second plurality of openings are configured to direct the second pressurized fluid portion into the second first pneumatic isolator.

In one embodiment, the at least one device includes at least one sensor device or at least one magnetic source element.

In one version of the embodiment, the at least one sensor device includes at least one accelerometer, a gyro sensor, a piezoelectric transducer, or a battery device.

In one embodiment, the at least one protective enclosure includes at least one set of pockets orientated in a plane perpendicular to the longitudinal axis, and wherein each pocket of the at least one set of pockets is configured to accommodate a magnetic source element.

In one embodiment, the pressurized fluid is a gas or a liquid.

In one embodiment, the structural member is a drill rod or a drill rod attachment.

In one embodiment, the external stress stimuli include stress waves, vibrations or thermal energy applied to the structural member.

In one embodiment, the pressurized fluid has a predetermined fluid pressure, the first pressurized fluid portion has a first variable fluid pressure, and the second pressurized fluid portion has a second variable fluid pressure, a sum of the first variable fluid pressure and the second variable fluid pressure being approximately equal to the predetermined fluid pressure.

In yet another aspect, the present invention is directed to a method comprising the steps of providing a structural member having a longitudinal axis: providing an apparatus comprising a housing member including a first end, a second end, and at least one protective enclosure configured to accommodate at least one device, the housing member further including a first pneumatic isolator formed at the first end and a second pneumatic isolator formed at the second end: coupling the housing member to the structural member such that the housing member is rotationally registered to the structural member, wherein the housing member is configured to move on the structural member parallel to the longitudinal axis in the operational state with a substantially frictionless reciprocating motion: entering an operational state wherein a pressurized fluid is conducted through the structural member: applying a first pressurized fluid portion of the pressurized fluid to the first pneumatic isolator to drive the housing member toward a second direction of the substantially frictionless reciprocating motion: applying a second pressurized fluid portion of the pressurized fluid to the second pneumatic isolator to drive the housing member toward a first direction of the substantially frictionless reciprocating motion opposite the second direction; and wherein the substantially frictionless reciprocating motion is a function of the first pressurized fluid portion, the second pressurized fluid portion and external stimuli such that the housing member is substantially isolated from the external stimuli.

In one embodiment, the pressurized fluid is a gas or a liquid.

In one embodiment, the pressurized fluid has a predetermined fluid pressure, the first pressurized fluid portion has a first variable fluid pressure, and the second pressurized fluid portion has a second variable fluid pressure, a sum of the first variable fluid pressure and the second variable fluid pressure being approximately equal to the predetermined fluid pressure.

In one embodiment, the external stress stimuli include stress waves, vibrations or thermal energy applied to the structural member.

In one embodiment, the at least one device includes at least one sensor device or at least one magnetic source element, wherein the at least one sensor device includes at least one accelerometer, a gyro sensor, a piezoelectric transducer, or a battery device.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
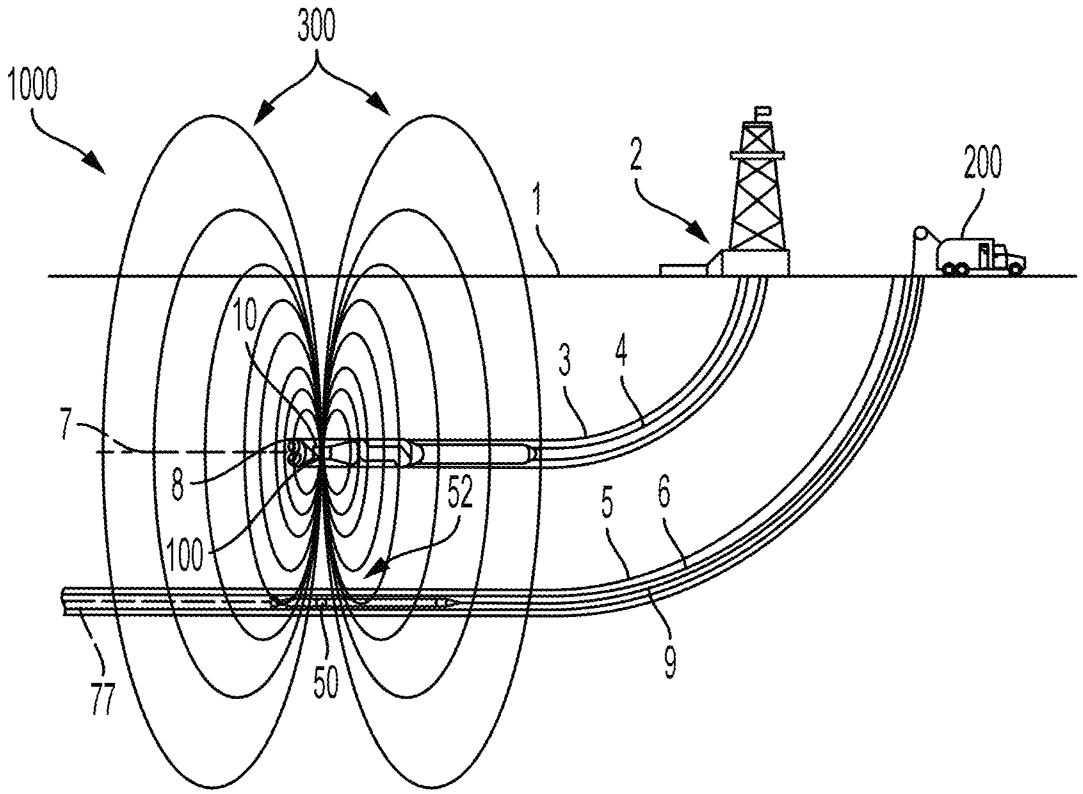
FIG. 1 is a cross-sectional view of a pair of horizontal, spaced wells in accordance with one application of the present invention.

Reference will now be made in detail to the present embodiments of the invention, examples of which are illustrated in the accompanying drawings. Wherever possible, the same reference numbers will be used throughout the drawings to refer to the same or like parts. An exemplary embodiment of the downhole assembly of the present invention is shown in FIG. 1, and is designated generally throughout by reference numeral 10.

As depicted in FIG. 1, a cross-sectional view of a measurement system 1000 featuring a magnetic source apparatus 10 and a magnetic field measurement sensor 50 is disclosed. As described below, the magnetic source apparatus 100 of the present invention can be equipped with pneumatic isolators 12-5 (shown and described below).

In FIG. 1, the measurement system 100 is shown in the context of a pair of horizontal, spaced wells in accordance with an application of the present invention. This view illustrates a method and apparatus for guiding the directional drilling of a second borehole 3 relative to a first (previously drilled) borehole 5 such that the new borehole 3 is separated from the existing borehole 5 by a predetermined distance along their respective paths. The new borehole 3 contains a drill string 4 that carries or includes the magnetic source apparatus 10 (as well as the pneumatic isolator assembly). The drill assembly includes a drill bit 8 which is driven by suitable motors in a conventional manner, to rotate about a longitudinal axis of rotation and/or to reciprocate (axially hammer) along the longitudinal axis. The drill bit 8 may be steerable to control the drilling direction in response to control signals provided by a control station 2 located at the surface 1 (of the Earth). The magnetic source apparatus 10 includes a plurality of magnet elements 100 that generate an elliptically polarized rotating magnetic field 300 that is centered at the magnetic source apparatus 10 in the new borehole 3. The magnetic source apparatus 10 includes a magnetic field source 100 which may be implemented using a permanent bar magnet 100 mounted in a non-magnetic portion of the assembly (not shown in this view) located at the distal end of the drill string behind the rotating drill bit 8. The magnets 100 have north-south axes that are perpendicular to the longitudinal axis 7 of the drill bit 8. Because assembly 100 rotates (and/or reciprocates) about the longitudinal axis 7 with the drill bit 8, the elliptically polarized magnetic field 300 is an alternating magnetic field at observation point 52 (which is radially spaced from the magnets 100).

The existing borehole 5 is illustrative of a horizontal well of the type which may be used for steam assisted gravity drainage of heavy oil (SADG). Of course, the present invention may be employed in any type of drilling application (and/or in any orientation) such as oil and gas drilling operations, geothermal, hammer drilling, top-hammer drilling, mining and/or other such drilling operations. In the example depicted in FIG. 1, the drill bit 8 is controlled so that the borehole 3 is drilled directly above borehole 5 and is spaced above it by a predetermined, substantially constant distance. Control of the drill bit 8 is carried out in response to measurements made in the target borehole 5 by a magnetic field sensor 50. The measuring tool 50 is lowered into the borehole 5 through a casing by means of a suitable wireline 9, with the location, or depth, of the measuring tool being controlled from the earth's surface in conventional manner from an equipment truck 200.

Again, the magnetic field sensor 50 is located at an observation point 52 and may incorporate a pair of fluxgate magnetometers having their axes of maximum sensitivity intersecting each other at the observation point and at right angles to each other. The magnetometers measure the amplitude and the phase of two perpendicular components of the magnetic field 300. The measuring tool 50 may also include additional sensors such as earth's field sensors, inclinometers, and/or a gyroscope (depending on the application).

Figure 2:
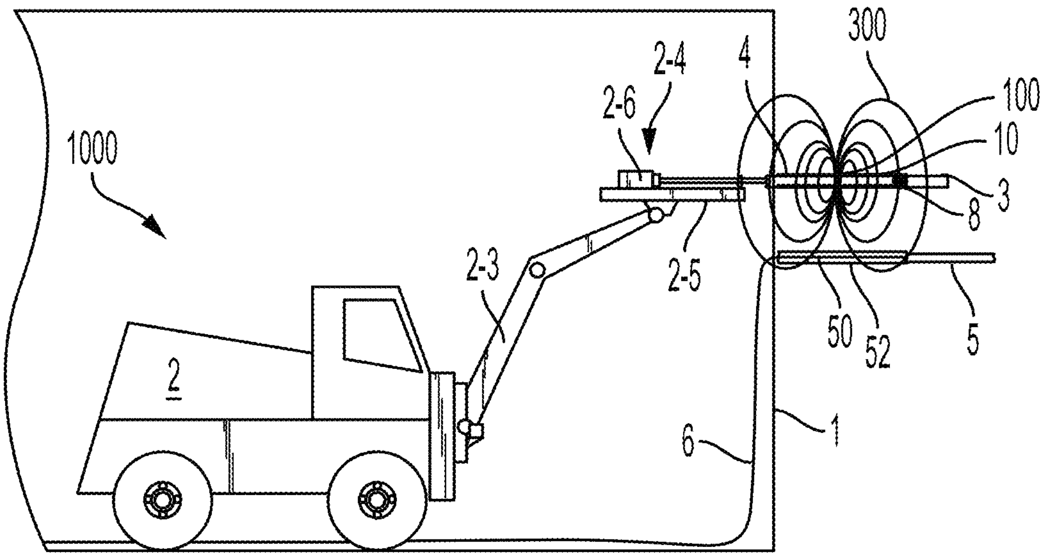
FIG. 2 is a cross-sectional view of a pair of horizontal, spaced boreholes in accordance with another application of the present invention.

As embodied herein and depicted in FIG. 2, a cross-sectional view of a pair of horizontal, spaced boreholes in accordance with another application of the present invention is disclosed. In this example application, a rock drilling assembly 1000 employs a movable carrier 2 having one or more booms 2-3 connected to the carrier 2. A drilling unit 2-4 may be disposed at the distal end of the boom 2-3. The drilling unit 2-4 may comprise a feed beam 2-5 and a rock drilling machine 2-6 which drives the drill rod 4 and hence drill bit 8 into a rock wall 1. In this application the drilling assembly is used to form a series of boreholes in the rock face, wherein each borehole is formed such that it follows a predetermined path in three-dimensional space within the rock wall/structure 1.

Like the application depicted at FIG. 1, the measurement system 1000 features a magnetic source apparatus 10 (that includes the pneumatic isolator assembly) and a magnetic field measurement sensor 50. In this application, a cross-sectional view of a pair of horizontal, spaced boreholes is shown. Like the previous application shown at FIG. 1, this view illustrates a method and apparatus for guiding the directional drilling of a second borehole 3 relative to a first (previously drilled) borehole 5 such that the new borehole 3 is separated from the existing borehole 5 by a predetermined distance along their respective paths. The new borehole 3 contains the magnetic source apparatus 10. As before, the magnetic field sensor 50, located at an observation point 52, and may incorporate a pair of fluxgate magnetometers having their axes of maximum sensitivity intersecting each other at the observation point and at right angles to each other. The magnetometers measure the amplitude and the phase of two perpendicular components of the magnetic field 300. The measuring tool 50 may also include additional sensors such as earth's field sensors, inclinometers, and/or a gyroscope (again, depending on the application).

Figure 3:
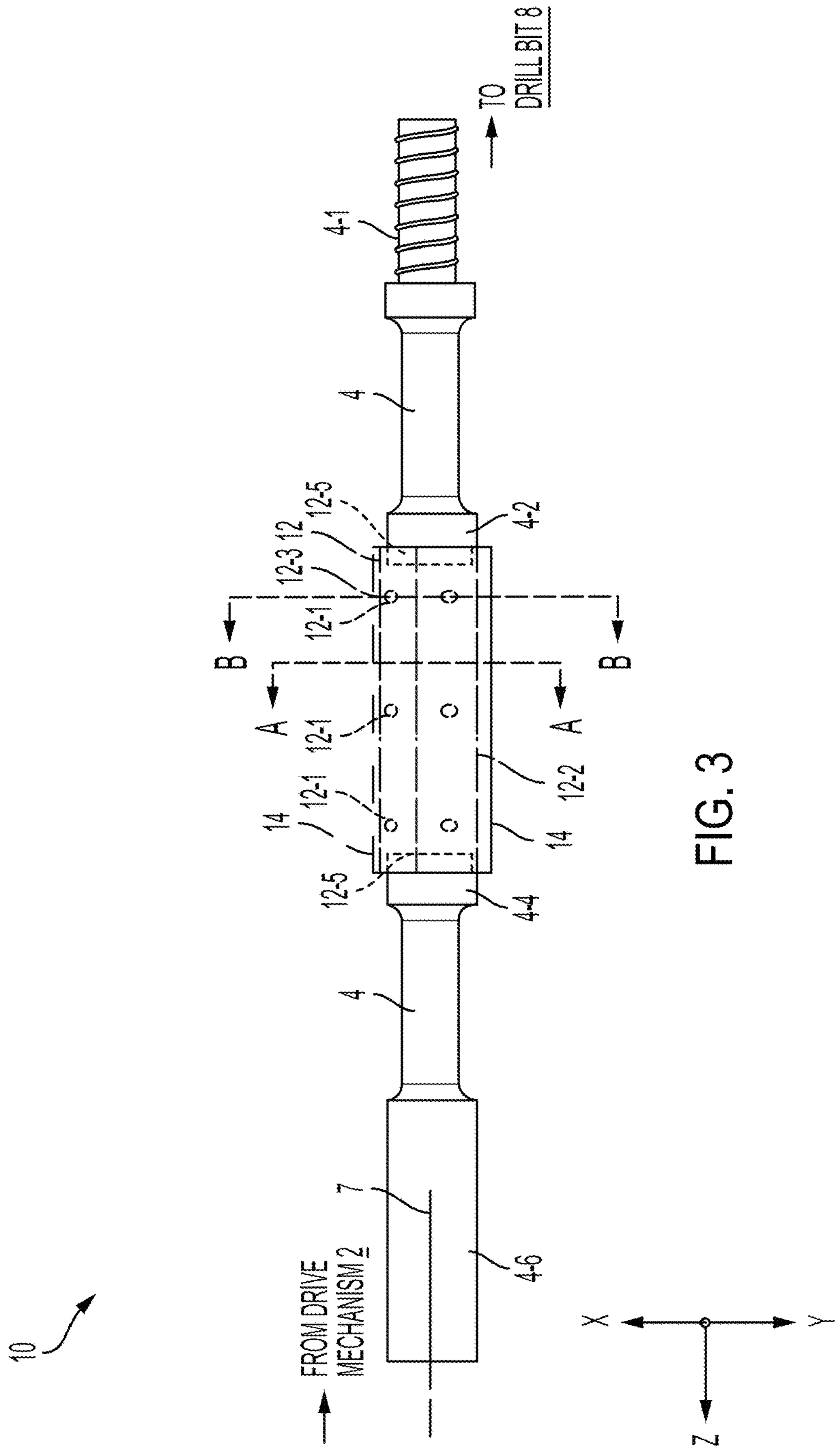
FIG. 3 is a diagrammatic depiction of a downhole apparatus in accordance with an embodiment of the present invention.

As embodied herein and depicted in FIG. 3, a diagrammatic depiction of a downhole assembly 10 (equipped with a pneumatic isolator assembly) in accordance with an embodiment of the present invention is disclosed. The downhole assembly 10 may include a drill rod 4, which is typically employed in the example applications depicted at FIGS. 1 and 2. (As noted above, the present invention should not be deemed to be limited to the example applications depicted at FIGS. 1 and 2. One skilled in the art will appreciate that the present invention may be employed in other applications and, thus, the drill rod may be implemented using any structural member suitable for the application at hand).

The drill rod 4 (or structural member) includes shoulder members (4-2, 4-4) that are used to accommodate a downhole housing 12 disposed therebetween. The drill rod 4 may include a box portion 4-6 at one end thereof, and a pin portion 4-1 at second, opposite end thereof. The box portion 4-6 may be configured to accommodate a drive member associated with the drilling assembly 1000. The pin portion 4-1 may be configured to accommodate a drill bit or some other tool suitable for the instant application.

The downhole housing 12 includes a first housing portion 12-2 and a second housing portion 12-3. In the magnetic source embodiment, each housing portion (12-2, 12-3) includes magnetic field source elements (e.g., permanent magnets) 100 (not shown in this view) that are configured to generate magnetic field 300 (as shown at FIGS. 1 and 2). In the sensor assembly embodiment, and as described below, the portions (12-2, 12-3) may include a power supply and or battery, a gyro sensor, accelerometers, rotational sensors, receiver, transmitter, a controller and/or memory. During assembly, the first housing portion 12-2 is coupled to the second housing portion 12-3 by connector elements which are disposed in connector vias 12-1. Once the first housing portion 12-2 is coupled to the second housing portion 12-3, the downhole housing 12 is spatially registered to the tool face of any bit or tool coupled to the pin portion 4-1. A pneumatic isolator portion 12-5 is formed at each end of the housing 12. The downhole housing 12 may be disposed within a non-magnetic cover 14 that is fastened to the housing 12 using any suitable fastener elements (e.g., screws, rivets, etc.). The interior configuration of the downhole housing 12 is described in greater detail below in conjunction with FIGS. 5-7.

Figure 4:
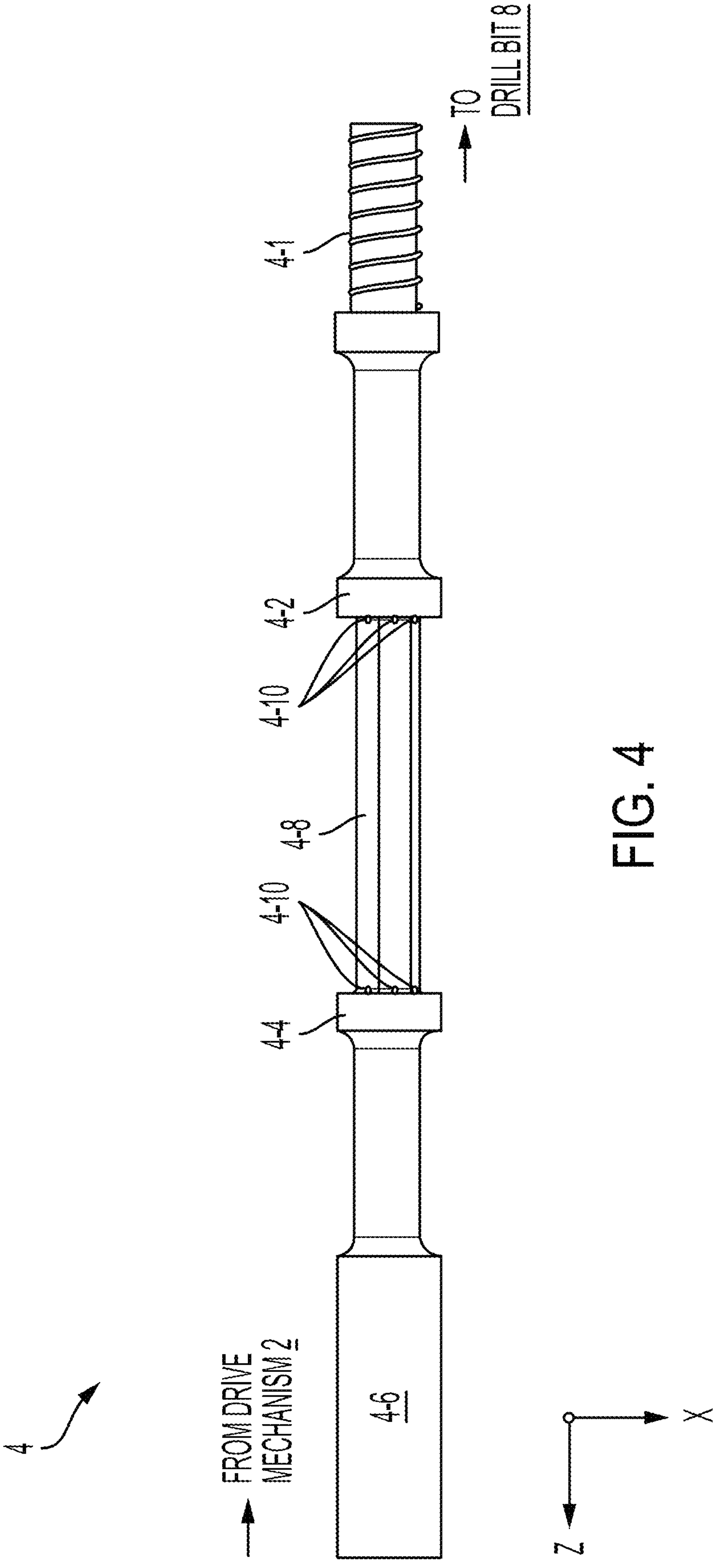
FIG. 4 is a detail view of a rod portion of the downhole apparatus depicted in FIG. 3.

In reference to FIG. 4, a detail view of the drill rod portion 4 of the downhole apparatus 10 depicted in FIG. 3 is disclosed. The drill rod 4 includes a source/sensor carrying region 4-8 disposed between the shoulder members (4-2, 4-4). (Depending on the housing embodiment, region 4-8 either carries a magnetic source housing or a sensor housing). The source/sensor carrying region 4-8 is used to accommodate the downhole housing 12 thereon. As before, the drill rod 4 may include a box portion 4-6 at one end thereof, and a pin portion 4-1 at second, opposite end thereof. Fluid channels 4-10 are disposed within the payload carrying region 4-8 substantially adjacent to the shoulder members (4-2, 4-4). In one embodiment, the fluid channels 4-10 are disposed at equidistant points around the drill rod circumference (e.g., eight channels spaced apart in 45° increments). Those skilled in the art will appreciate that the size and number of the fluid channels 4-10 may depend on the fluid traversing the channels (e.g., air, water, etc.), as well as the application for which the assembly is being used. Accordingly, more or less channels 4-10 may be employed depending on the embodiment and/or application. For example, the number and size of the fluid channels may correspond to fluid (air) pressure requirements of the pneumatic isolators 12-5.

Figure 6A:
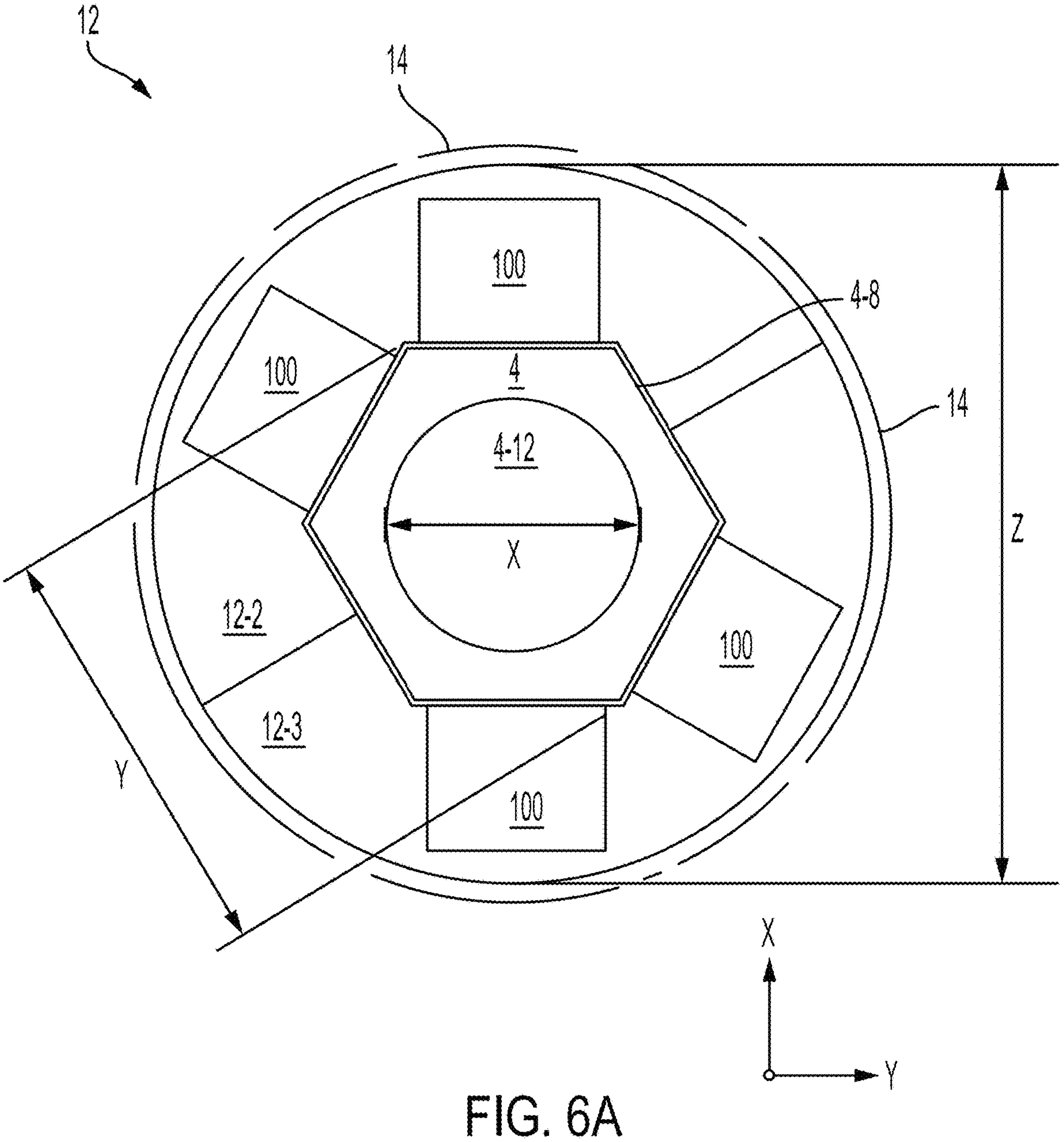
FIG. 6A is a cross-sectional view of the magnetic source housing through section A-A shown at FIG. 3.
Figure 7:
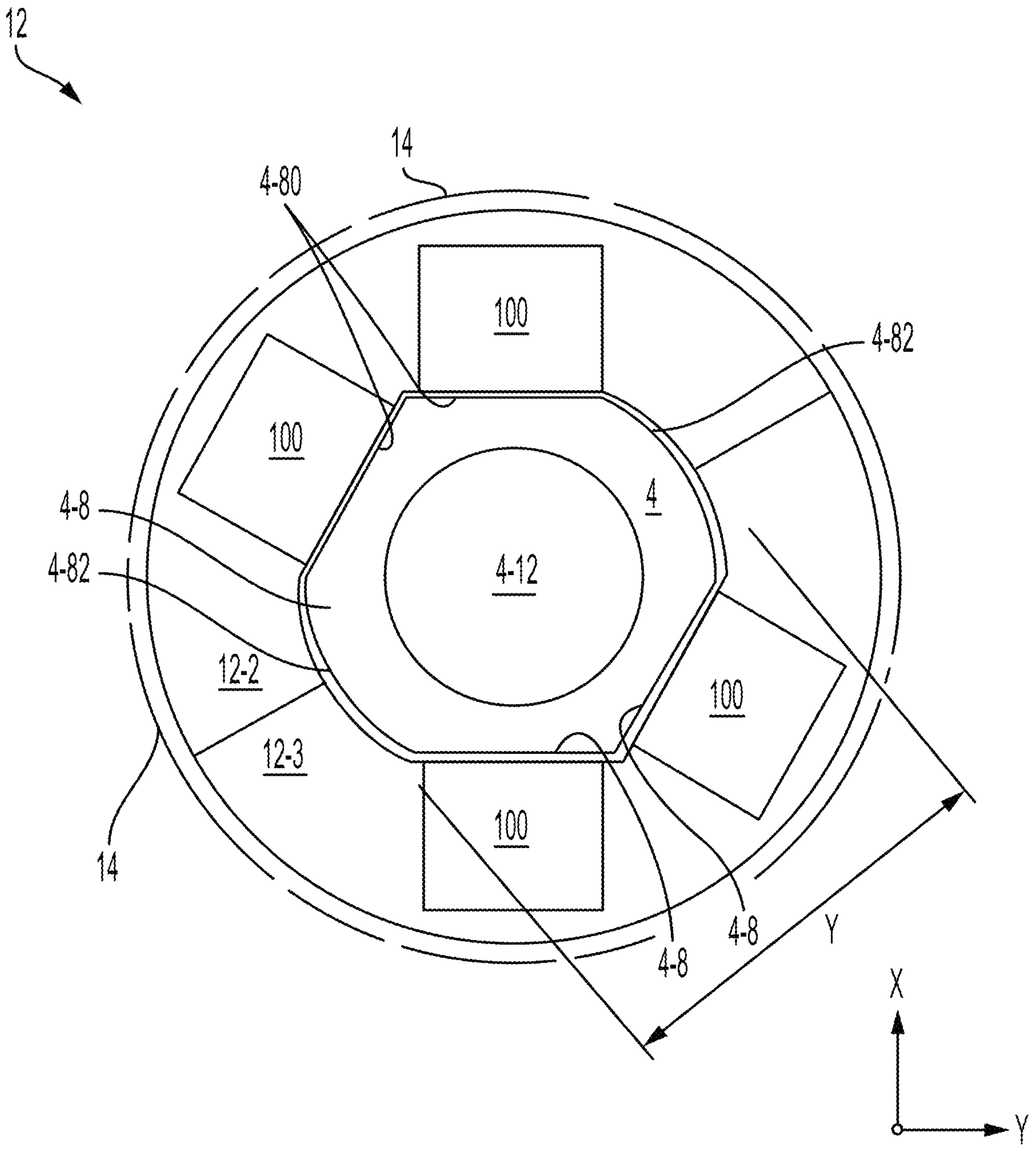
FIG. 7 is a cross-sectional view of the magnetic source housing through section A-A shown at FIG. 3.

The source/sensor carrying region 4-8 may be characterized by a hexagonal cross-section in one embodiment thereof (FIG. 6A). In another embodiment, the source/sensor carrying region 4-8 may be characterized by an irregularly-shaped cross-section (as shown at FIG. 7).

In one embodiment, the drill rod 4 is formed by a machining a steel alloy billet (e.g., using a CNC milling machine) to produce an integrally formed drill rod. In another alternate embodiment, the shoulder members (4-2, 4-4) may be formed on a steel alloy rod using a sputter-welding process, wherein layers of steel material are deposited and built-up along the circumference of the rod at appropriate locations. The built-up portions are then machined (using, e.g., a lathe) to form the shoulder portions (4-2, 4-4). The box portion 4-6 and the pin portion 4-1 may be welded to their respective ends of the drill rod 4 by way of a friction-welding process. In the various alternate embodiments, those of ordinary skill in the art will appreciate that the shoulders (4-2, 4-4), pin 4-1, box 4-6, and other such features may be formed and/or machined using any suitable fabrication method(s).

In one embodiment of the present invention, the drill rod may be formed using a chrome-molybdenum AISI Alloy 4140 steel bar (which has, e.g., a tensile strength of about 95,000 psi, an elastic modulus within a range of about 27,557-30,458 ksi, and a Brinell hardness of about 197). Thus, chrome-molybdenum AISI Alloy 4140 steel bars may be employed in each of the fabrication and machining embodiments described above.

Figure 5A:
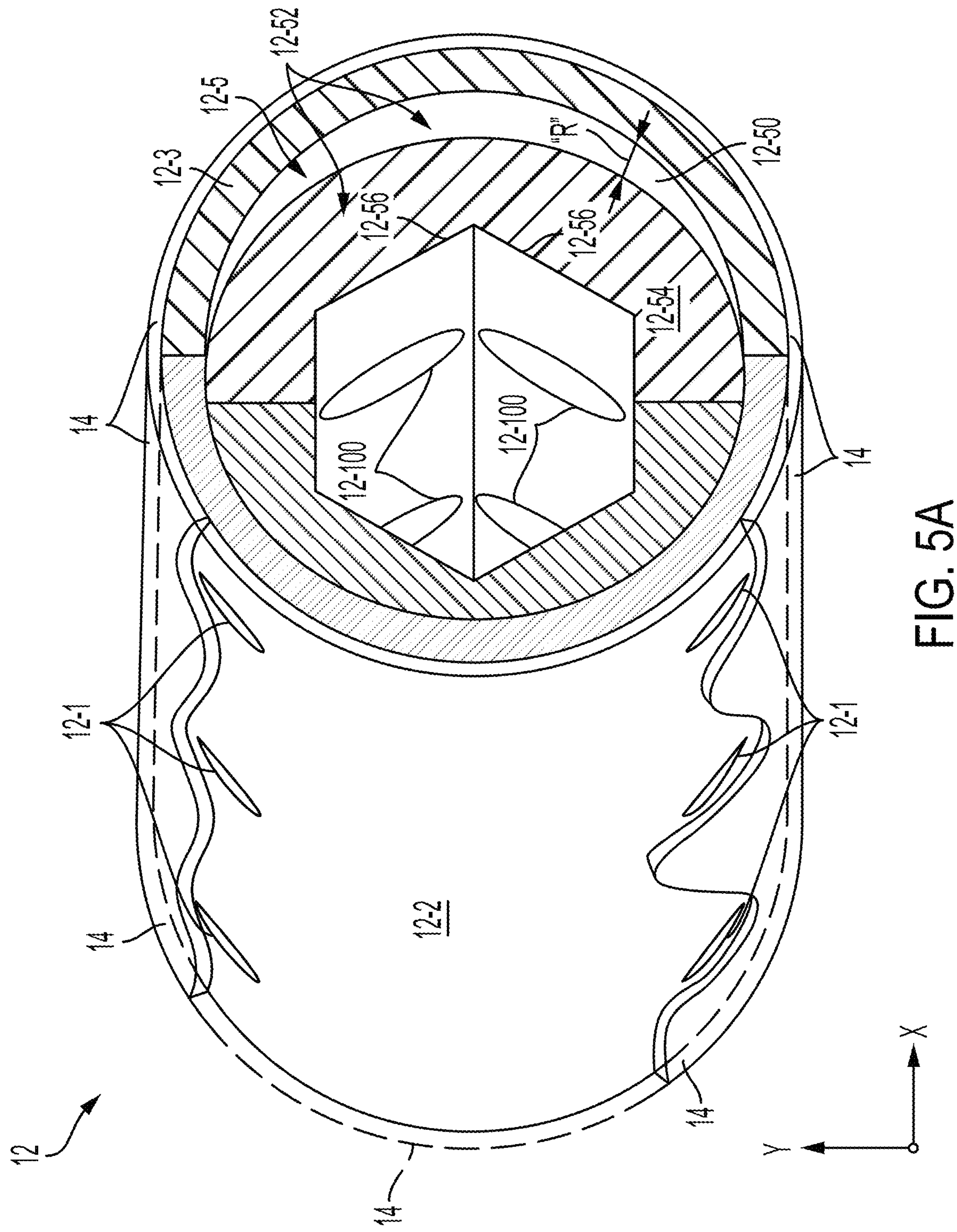
FIG. 5A is an isometric detail view of the magnetic source housing depicted in FIG. 3.

As embodied herein and depicted in FIG. 5A, an isometric view of a magnetic source housing 12 depicted in FIG. 3 is disclosed. The non-magnetic cover 14 is shown in a cut-away view to show the first housing portion 12-2 and the connector vias 12-1 disposed there within. The non-magnetic cover 14 may be formed using any suitable non-magnetic material including stainless steel, titanium, BeCu, aluminum, etc.

In one embodiment, the magnetic source housing 12 may be formed from a cylindrical or tube-shaped material (hereinafter "stock material") that is divided into two halves to form the first housing portion 12-2 and the second housing portion 12-3. In one embodiment, the stock material may be comprised of a Teflon PTFE resin material that substantially complies with UL 94V0 and ASTM D1710 standards. In other embodiments, the tube material may be comprised of any suitable material: for example, the material may be an acetal homopolymer (Polyoxymethylene POM) material sometimes known as Delrin. In another example, the material may be a Polyether ether ketone (PEEK) material, which is a colorless, organic, thermoplastic polymer. In yet another embodiment, the material may be bronze or a bronze alloy material. Those skilled in the art will appreciate that the materials of the tube used to form the magnetic source housing 12 may vary in accordance with the application since the environment (vibrations, shock, temperature, etc.) may also differ from application to application.

In one embodiment, the stock material may have an outer diameter (OD) of about 4 inches, an inner diameter (ID) of about two inches, and a wall thickness of about one inch. Those of ordinary skill in the art will appreciate that the dimensions of the stock material used to form the downhole housing 12 may vary in accordance with the embodiment and/or application.

Figure 5B:
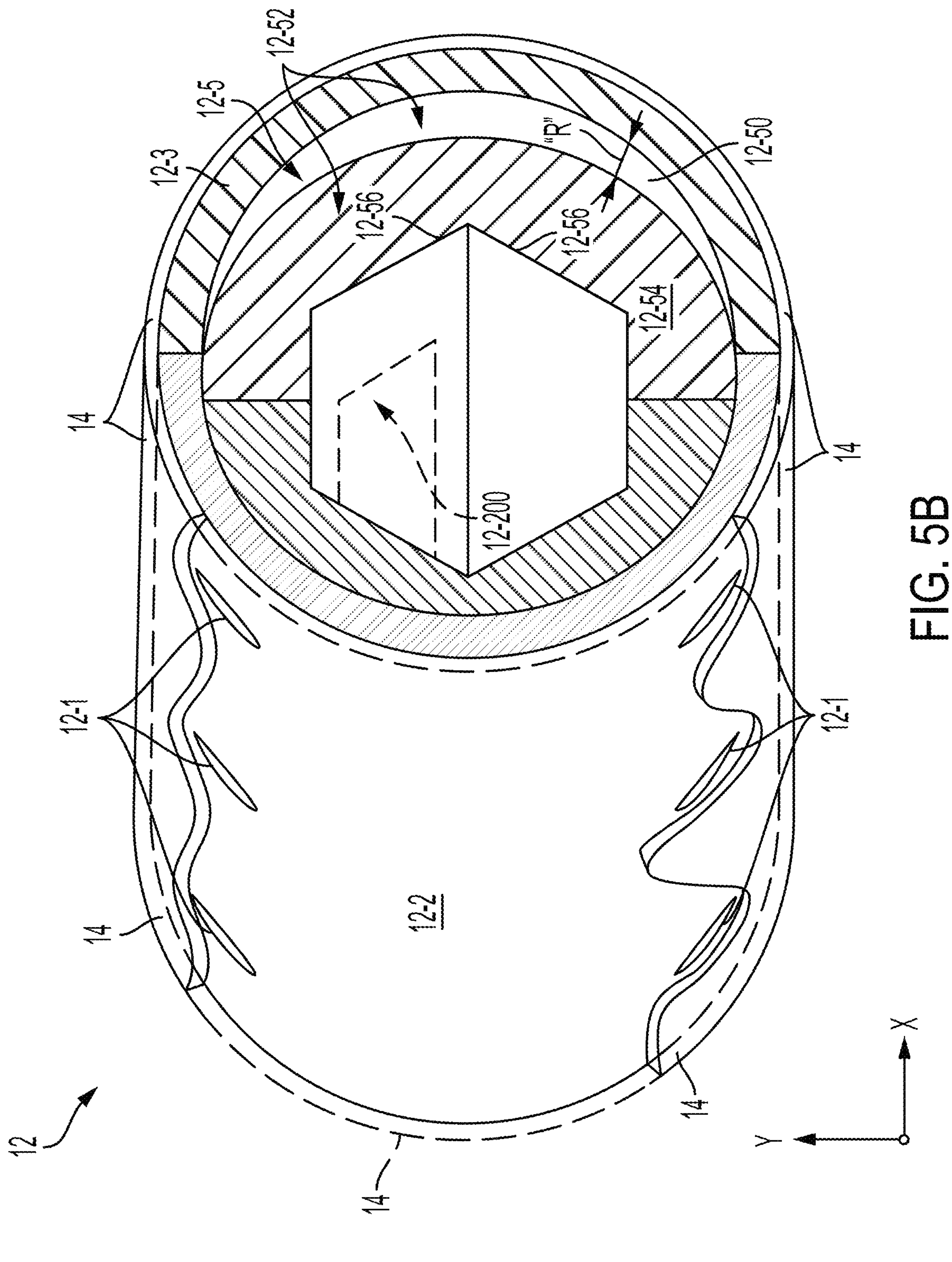
FIG. 5B is an isometric detail view of a sensor housing depicted in FIG. 3.
Figure 5C:
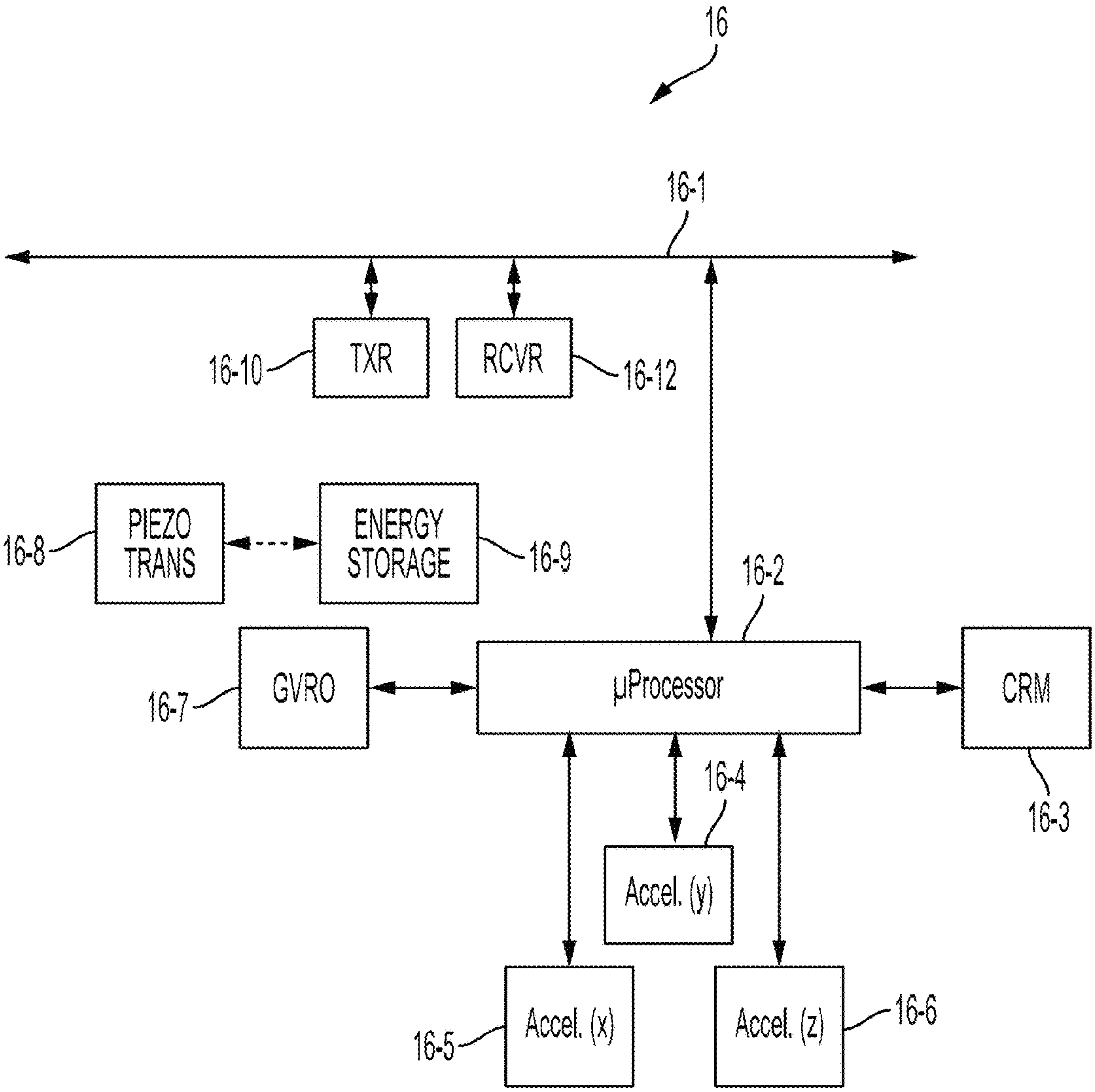
FIG. 5C is a diagrammatic depiction of the sensor assembly depicted at FIGS. 1-3.

Referring back to FIG. 5A, before the stock material is separated into two parts (i.e., to form the first housing portion 12-2 and the second housing portion 12-3), the stock material may be machined to include the various features depicted at FIGS. 5A-5C. For example, the stock material may be machined to include the connector vias 12-1, magnetic source pockets 12-100, sensor assembly pockets 12-200 (See FIG. 5B), the pneumatic isolator portion 12-5 and its constituent elements. The connector vias 12-1 may be configured to accommodate any suitable fastener element (e.g., a pop-rivet, etc.) for connecting the first housing portion 12-2 to the second housing portion 12-3 during assembly: i.e., when the downhole housing 12 is coupled to the source/sensor carrying region 4-8 of the drill rod. Alternatively, some or all of the features may be machined after the stock material is separated into two parts.

The pneumatic isolator portion 12-5 includes a piston-chamber 12-52 formed by a rim 12-50 that extends outwardly and perpendicularly from the inner abutment wall 12-54 by a distance "R." Each pneumatic isolator portion 12-5 also includes a housing registration feature 12-56 (which is described in greater detail below). Note that each end of the downhole housing 12 includes a pneumatic isolator 12-5.

Each magnetic source pocket 12-100 is configured to accommodate a magnetic source element 100 and an epoxy (or other) potting material. The potting material is employed to hold the magnetic element 100 in place within its respective pocket 12-100.

The magnetic sources 100 employed in the invention may vary in accordance with the application since the environment (vibrations, shock, temperature, etc.) or desired operating parameters may also change in accordance with the application. Some non-limiting examples of operating parameters may be remanence, coercivity, Curie temperature, and etc. Accordingly, the magnetic source elements 100 may be implemented using neodymium rare earth magnets, samarium cobalt magnets or any suitable magnetic source elements depending on the application.

As described herein, the registration feature 12-56 may be configured as a hexagonally-shaped channel that is machined (or otherwise formed) to accommodate a hexagonally-shaped source-carrying region 4-8 of the drill rod there within. (Note that registration feature and source-carrying region 4-8 may be machined to conform to any suitable geometry and is thus not limited to a hexagonal shape: see, e.g., FIG. 7). Consequently, the registration feature 12-56 conforms to the source-carrying region 4-8 of the drill rod such that the downhole housing 12 is in a fixed spatial relationship (i.e., it is registered to) to the drill rod 4 in at least two-dimensions. On the other hand, (cf. FIGS. 5, 11, and 12) note that the downhole housing 12 is configured to slide along the source-carrying region 4-8 between the two shoulders (4-2, 4-4) in a substantially frictionless manner. The maximum sliding distance at each end of the housing 12 is equal to the distance "R," which is the distance from the abutment wall 12-54 to the rim 12-50. Consequently, the magnetic field 300 measurements taken by the sensor 50 (at FIGS. 1 and 2) are not affected by the movement because the magnetic source elements 100 can only slide a maximum distance of about "2R" along the longitudinal axis. Stated briefly, therefore, the downhole housing 12 is substantially registered to the drill rod 4 (and hence to a tool face connected to the drill rod) in three-dimensional space.

In some embodiments, the housing 12 may include an O-ring (not shown at FIG. 5) that seals the volume formed by the registration feature 12-56 from the piston-chambers 12-52. Stated differently, an O-ring may be positioned at each end of the registration feature 12-56. The O-ring is configured to seal the interior of the registration feature 12-56 when or if it is packed with grease or some other lubricant material.

Referring to FIG. 5B, an isometric detail view of a sensor housing 12 depicted in FIG. 3 is disclosed. In this view, housing 12 is substantially the same as the source housing 12 depicted at FIG. 5A: accordingly, any description of like or similar elements are omitted for the sake of brevity. In this embodiment, each sensor pocket 12-200 is an enclosure configured to accommodate all or a portion of the sensor assembly 16 (as described herein) and an epoxy (or other) potting material. The potting material is employed to hold the sensor assembly 16 components in place within their respective pocket 12-200.

Referring to FIG. 5C, a diagrammatic depiction of the sensor assembly depicted at FIG. 5B is disclosed. The sensor assembly 16 includes various modules coupled together by a bus system 16-1. The bus system 16-1 is coupled to a microprocessor 16-2 and computer readable memory (CRM 16-3). Moreover, the sensor assembly 16 also includes an accelerometer module (16-4, 16-5, 16-6) that is configured to sense three gravity direction (xyz) vector components. A gyro sensor 16-7 is configured to detect angular velocity and generate a commensurate angular rate signal. As those skilled in the art will appreciate, the gyroscope 16-7 is used for measuring the device's orientation and/or angular velocity. Like the previous embodiments described above, the sensor assembly 16 may include a magnetometer 16-14. The magnetic field sensor 16-14 may incorporate a pair of fluxgate magnetometers having their axes of maximum sensitivity intersecting each other at the observation point and at right angles to each other. The magnetometers measure the amplitude and the phase of two perpendicular components of the magnetic field 300.

The sensor assembly 16 also includes a piezoelectric transducer 16-8 that is configured to convert the mechanical energy (W) generated by the drilling operations into electrical energy. (An expression for the mechanical energy is provided below). As those skilled in the relevant arts would appreciate, the piezoelectric effect converts mechanical strain into electric current or voltage. The electrical current is provided to an electrical storage device 16-9 which includes a battery for storing the harvested energy. In an alternate embodiment, electrical power may be provided to the system 10 by way of wireline.

Finally, the sensor assembly 16 further includes a transmitter device 16-10 and a receiver 16-12. The transmitter 16-10 and receiver may be configured as a wireless or as a wireline transceiver configured to communicate with an uphole telemetry system (not shown in this view). In one embodiment, the uphole telemetry system is configured to manipulate all of the sensor data provided by the sensor assembly 16 (disposed down-hole). This information, or some of the information, may be transmitted to a driller controller (FIGS. 1-2) so that an appropriate course correction can be made (if necessary). In another embodiment, data transfer may be effected when the device 10 is retrieved from the downhole environment.

The microprocessor 16-2 may be configured to bi-directionally communicate with the various components coupled to the bus 16-2. In this embodiment, the microprocessor 16-2 may include on-board analog-to-digital conversion (ADC) channels that accommodate the analog output signals of the accelerometers (16-4-16-6). The analog output signal of the gyro sensor 16-7 may also be converted into digital signals.

The sizing and selection of the microprocessor 16-2 is considered to be within the skill of one of ordinary skill in the art with the following proviso: obviously, if the functionality of the up-hole control system is incorporated into the down-hole system, the computational burden of the resultant processor will necessarily be greater. In any event, in accordance with the embodiment of FIG. 5C, the microprocessor 16-2 may be implemented using any suitable processing device depending on processing speed, cost, and durability considerations. In one embodiment, therefore, processor 16-2 may be implemented using a 16 bit, a 32-bit, a 64 bit, or any suitable microcontroller coupled to any suitable computer readable media 16-3. As noted above, the microcontroller may be more or less powerful depending on cost/processing speed considerations.

The term "computer-readable medium" as used herein refers to any medium that participates in providing data and/or instructions to the processor 16-2 for execution. Such a medium may take many forms, including but not limited to RAM, PROM, EPROM, EEPROM, FLASH-EPROM or any suitable memory device, either disposed on-board the processor 16-2 or provided separately. In one embodiment, the processor 16-2 may include 256 KB of flash memory and 32 KB of SRAM.

In reference to FIG. 6A, a cross-sectional view of the magnetic source housing 12 through section A-A (as shown at FIG. 3) is disclosed. In this view, the section is taken through the source/sensor carrying region 4-8 of the drill rod 4. Note that a central fluid-flow channel 4-12 extends through the entire length of the drill rod 4 and is centered about the longitudinal axis 7 (see, e.g., FIG. 1). The diameter of the central fluid-flow channel 4-12 is dimension "X;" in one embodiment, the dimension X may be about 0.870 inches. Dimension "Y" corresponds to the diameter of the source/sensor carrying region 4-8 before machining is performed. In one embodiment, the dimension Y may be about 2.470 inches. (The fluid transmitted through via 4-12 may be air of some other suitable fluid).

Note that in this view, the section taken through magnetic source housing 12 and cover 14 includes a set of four magnetic source elements 100. Depending on the embodiment and/or application, the housing 12 may include up to ten (10) sets of four magnetic source elements 100. In the embodiment shown at FIG. 6A, the housing 12 is characterized by a circular cross-section having a diameter of a dimension "Z". In one embodiment, the dimension Z may be about 3.470 inches.

Figure 6B:
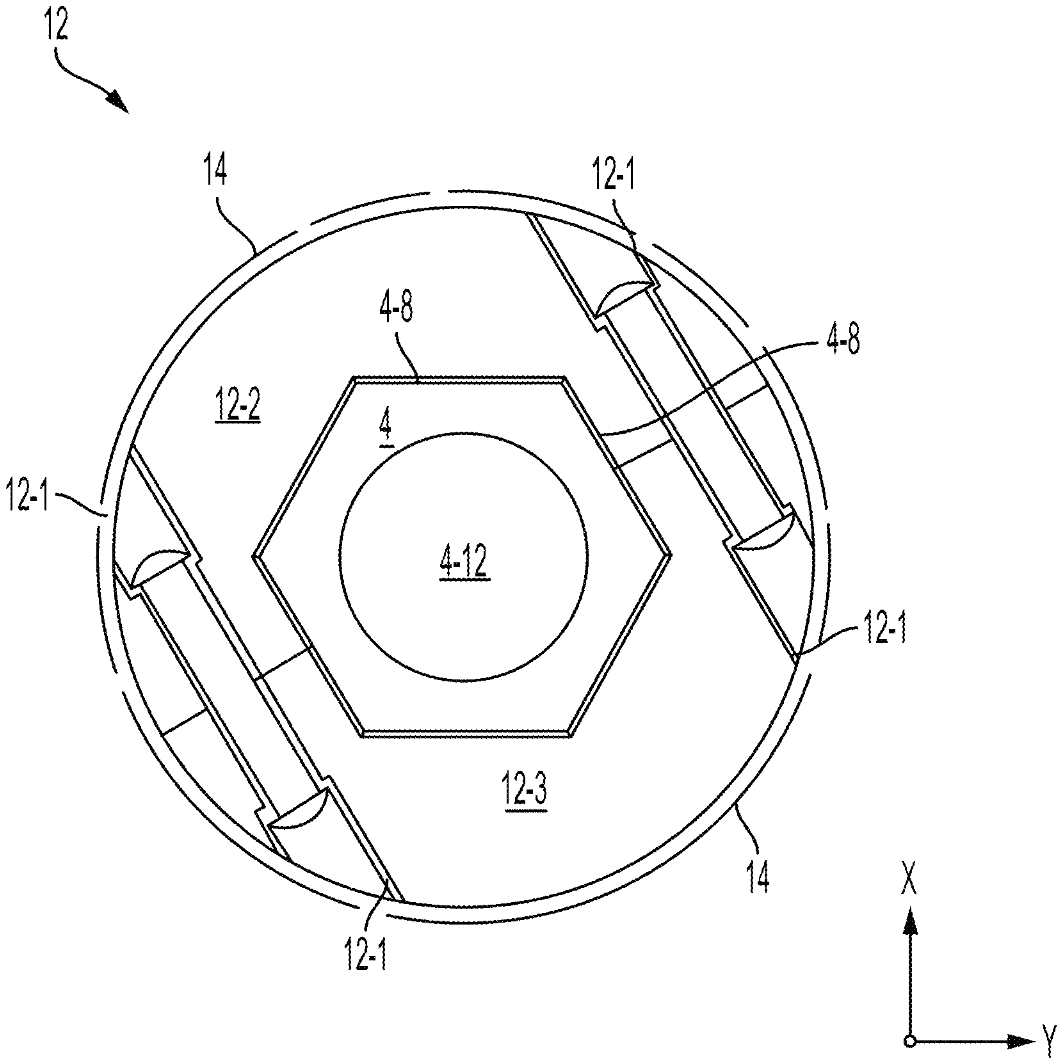
FIG. 6B is a cross-sectional view of a downhole (source or sensor) housing through section B-B shown at FIG. 3.

In reference to FIG. 6B, a cross-sectional view of the downhole (source or sensor) housing 12 (through section B-B shown at FIG. 3) is disclosed. In this view, the section is taken through a set of dual-connector vias 12-1. A description of the drill rod 4, the source/sensor carrying region 4-8, and the downhole housing 12 is omitted (for the sake of brevity) because these elements are identical to the elements depicted in FIG. 6A. In any event, each connector via 12-1 is shown to include a rivet (e.g., a pop-rivet) that is configured to tightly couple the first housing portion 12-2 to the second housing portion 12-3 when they are coupled to the source/sensor carrying region 4-8. Of course, any suitable connector may be employed.

In reference to FIG. 7, a cross-sectional view of the magnetic source housing 12 (through section A-A shown at FIG. 3) in accordance with an alternate embodiment of the present invention is disclosed. Note that in this embodiment the source/sensor carrying region 4-8 includes two sets of angled-planar regions 4-80 and two curvilinear regions 4-82. While each planar region 4-80 is shown to accommodate a magnetic source element 100 in the sectional-view of FIG. 7, in actuality, each planar region 4-80 accommodates a row of magnetic source elements (as region 4-80 extends into the page). Each curvilinear region 4-82 represents the circular cross-section of the drill rod 4 prior to machining; and thus, the curvilinear regions 4-82 are dimensionally characterized by a diameter of dimension Y (as described above).

Figure 8:
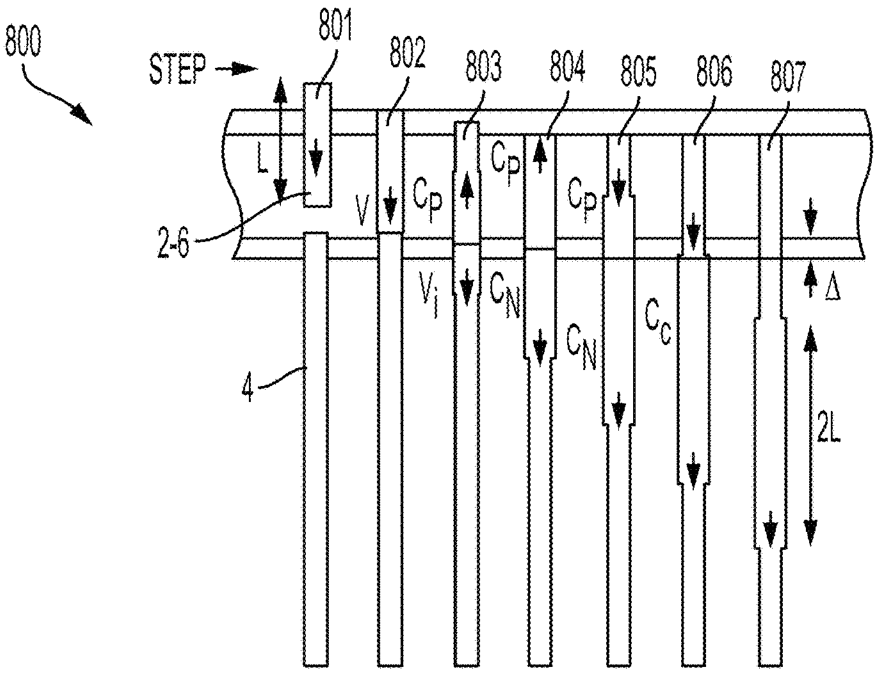
FIG. 8 is a diagrammatic depiction of a sequence of steps in a top-hammer rock drilling operation.

In reference to FIG. 8, a diagrammatic depiction of a sequence of steps in a top-hammer rock drilling operation is disclosed. In diagram 800, a top hammer rock drill is shown to include a hammer/piston 2-6 that is used to impact the drill rod 4. (See, e.g., FIG. 2). The hammer 2-6 may be implemented using any suitable hammer type, e.g., such as a pneumatic hammer (which uses compressed air) or a hydraulic hammer (which uses pressurized hydraulic fluid). (The drill rod 4 is a diagrammatically depicted in this view as an elongated cylinder: in practice, however, the drill rod 4 may be of the type depicted at FIGS. 3 and 4).

During operations, the drilling motor 2-4 may simultaneously provide a reciprocating motion as well as a rotational motion to drive the drill rod 4. The reciprocating motion provides the hammering action to the drill rod 4 while the rotational force slowly rotates the drill rod 4 and drill bit 8. As the borehole length increases, additional drill rods are added to the drill string by screwing a new drill rod onto the drill string that extends into the borehole. The kinetic energy of hammering action is transmitted by the drill rod 4 to the drill bit 8 to thus fragment the rock 1 during the drilling action. Accordingly, any sensor instrument package or magnetic source package attached to a down-hole drill rod 4 must be able to with-stand intense stresses and strains. In this case, the pneumatic isolators are configured to substantially isolate the magnetic housing 12 from the stress, energy and power flow associated with the drilling.

In step 801, the hammer 2-6 is shown prior to impact and is shown to have a length "L". In step 802, the hammer 2-6 moves toward the drill rod 4 with a velocity v and strikes the drill rod 4. In step 803, a compressive stress wave $C_p$ is generated in the hammer 2-6 and a compressive stress wave $C_H$ is also generated in the drill rod 4. These stress waves are depicted in the diagram as an increased diameter in each element. The induced compressive stress (σ) is substantially equal to:

$$\sigma = vE/2c \quad (1)$$

Where, v is the velocity, E is Young's (elastic) modulus of the material (hammer and drill rod), and c is the speed of sound in the hammer/rod. This assumes that the diameter and material of the hammer 2-6 and the drill rod 4 are the same.

In step 804, the stress wave $C_p$ reaches the upper end of the hammer 2-6 and is reflected; and the compressive stress wave $C_H$ continues to propagate down the length of the drill rod 4. In step 805, the reflected wave $C_p$ propagates down the hammer 2-6 and is transmitted into the drill rod 4 such that the stress waves $C_H$ and $C_p$ are combined. In step 806, the combined stress wave $C_c$ exits the hammer 2-6; and in response to being elastically compressed by the stress waves, the drill rod 4 has been displaced. The elastic compression (Δ) is substantially equal to:

$$\Delta = vL/c \quad (2)$$

In a typical top hammer application, Δ may be about 1.2 mm given a velocity (v) of 10 m/s and a hammer length (L) of about 0.6 m.

In step 807, the stress wave has a length 2L and propagates along the drill rod 4 at the speed of sound c, which is substantially equal to $$c = \sqrt{(E/\rho)} \quad (3)$$

Where σ is the density of the drill rod material. The stress wave propagates the mechanical energy W to the drill bit 8, where $$W_h = 1/2mv^2 \quad (4),$$

Wherein m is the mass of the hammer 2-6. Of course, the mechanical energy W is the energy that fragments the rock 1 (FIG. 2).

Figure 9:
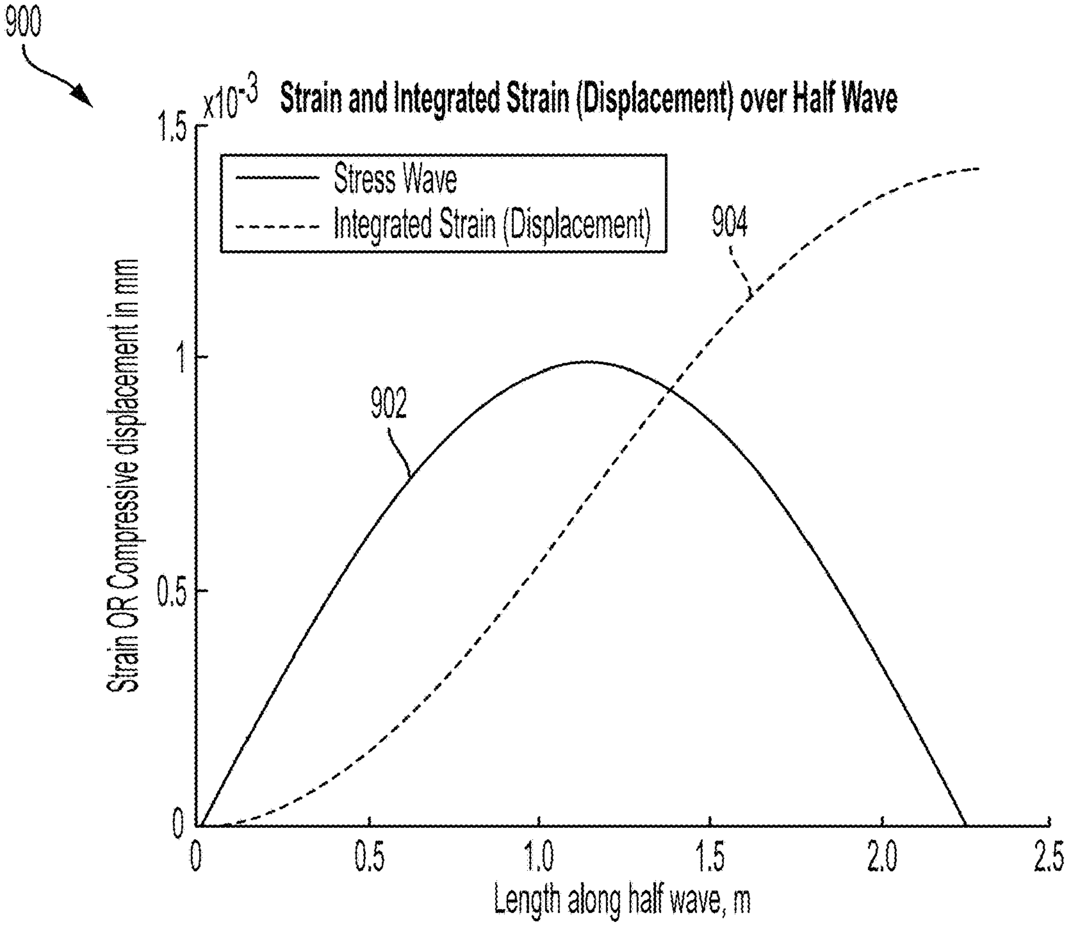
FIG. 9 is a chart showing a model of a stress wave resulting from a top-rock hammer drilling operation.

Referring to FIG. 9, a chart showing a model of a stress wave resulting from a top-rock hammer drilling operation is described. Briefly stated, the stress wave curve 902 can be modeled as a sine wave or a cosine wave. The drill rod displacement curve 904 is integrated strain. Those skilled in the art will appreciate that the form of the stress wave 902 depends on the rock drill, drilling parameters, the number of drill rods 4 in a given drill string, the type of rock being drilled, the hardness and the integrity of the rock material, and etc. Nonetheless, the stress wave may be reasonably modeled as a sinusoid to ascertain the energy and forces being brought to bear on the downhole housing 12 described above.

Figures 10A, 10B, 10C:
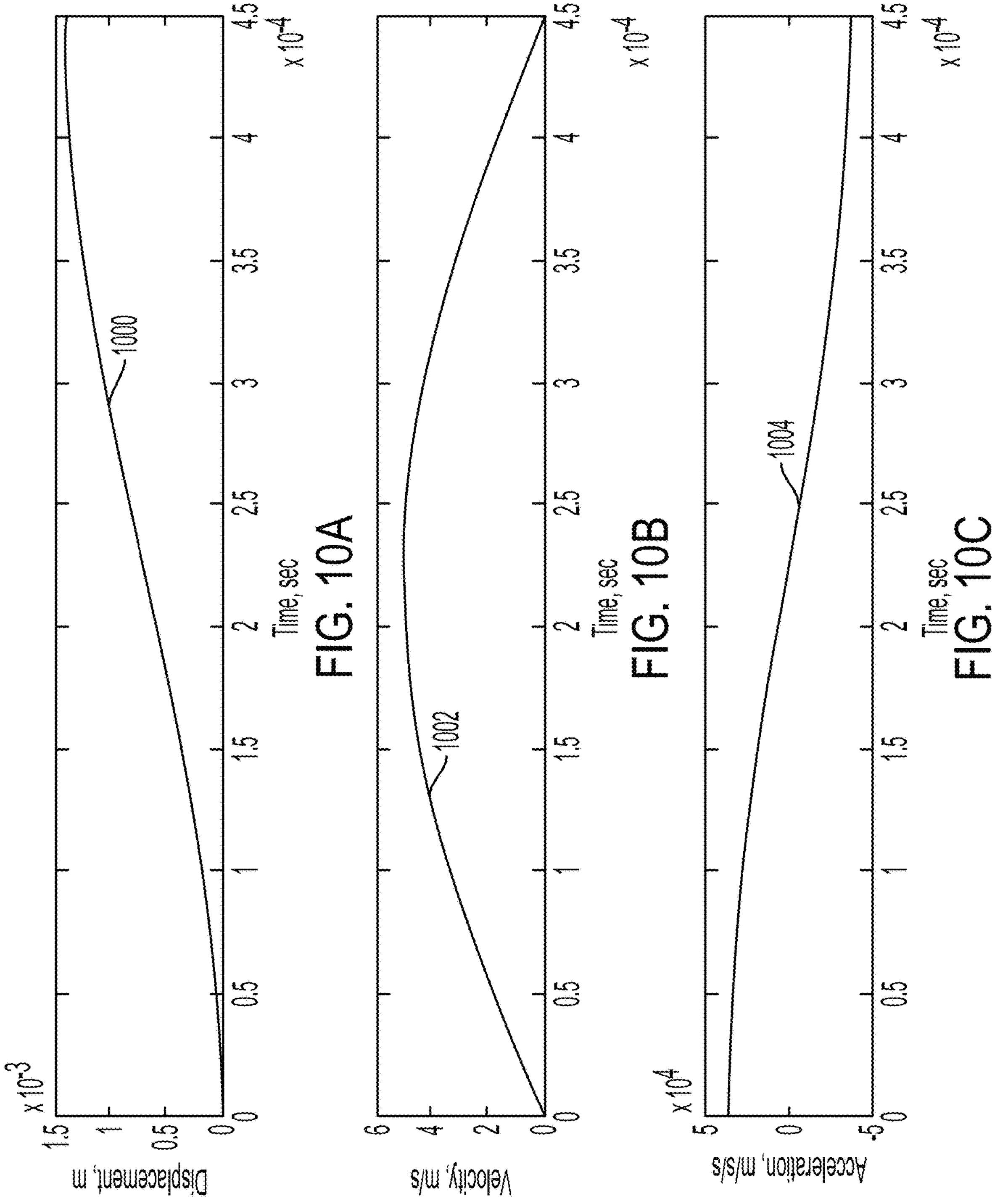
FIGS. 10A-C show displacement, velocity and acceleration for the strain associated with the top-hammer rock drilling operation.

In FIGS. 10A-C, the displacement, velocity and acceleration curves for the strain associated with the stress wave depicted at FIG. 9 (and the top-hammer rock drilling operation described at FIG. 8) are also shown. Note that the displacement curve 904 in FIG. 9 and the displacement curve 1000 at FIG. 10A show similar subject matter but employ different horizontal axes.

In any event, the mathematical model makes the following assumptions: first, that the stress wave is sinusoidal, and second, that the geometry and material of the hammer 2-6 and drill rod 4 are substantially the same. Most importantly, they both have the same acoustic impedance. The model starts with the stress wave shown at step 807 of FIG. 8. More formally, the drill rod 4 is modeled as a series of discrete rod elements: wherein each discrete element is characterized as having an appropriate mass and stiffness. Accordingly, the stress wave modeled by equation (5) is at some drill rod element "x" at time "t." In step 807, e.g., the impulse u(x, t) on the drill rod can be represented by:

$$u(x,t) = u_o \sin[(\pi/2L)(x-ct)], \text{ for } 0<x-ct<\pi \quad (5)$$

Wherein u(x,t) is the tiny displacement of an element on the drill rod from its equilibrium location x at time t. The factor "(x−ct)" indicates that u(x, t) describes a displacement propagating along the longitudinal axis "x" of the drill rod 4 toward the drill bit 8. While the shape of a wave pulse may assume any form, x and t must always appear in the combination with each other to satisfy the governing wave equation (i.e., the argument must include either (x−c·t) or (x+ct). If the argument is (x+ct), the stress wave displacement is propagating along the longitudinal axis "x" of the drill rod 4 toward the hammer 2-6 and away from the drill bit 8.

Again, while equation (5) models the stress wave as a sinusoidal wave, those skilled in the art will appreciate that the wave could be modeled as a square wave or as a rectangular pulse. The factor 2L in equation (5) indicates that the wave packet has a length 2L, which corresponds to the hammer's length, as shown at step 807 of FIG. 8.

Young's modulus of elasticity (E) is the ratio of stress (σ) over strain (ε), i.e., E=(σ/ε). Moreover, the strain (ε) is equal to du/dx. Accordingly, the stress wave σ associated with the wave element displacement u(x,t) may be expressed as:

$$\sigma = (E\varepsilon) = E(du/dx); \text{ or}$$

$$\sigma = E(\pi/2L)\, u_o \cos[(\pi 2L)(x-ct)] \quad (6),$$

Wherein E is Young's modulus of elasticity, which is about $2\times10^{11}$ $N/m^2$ for steel.

The velocity v of a molecule responding to the wave action is (du/dt);

$$\begin{aligned} du/dt &= [(\pi\ c)/(2L)]\ u_o\ \cos\ [(\pi/2L)(x-\cdot t)] \\ &= \sigma/(\rho c) \end{aligned}, \quad (7)$$

Where ρ is the density of steel ($8\times10^3$ $kg/m^3$; and the quantity (ρc) is known as the wave impedance.

The power S (per unit cross section area in $watts/m^2$) being delivered to the drill bit is the stress (σ) times the velocity v, i.e., $$S = \sigma(du/dt);$$

-continued $$S = \{E(\pi/2L)\ u_o\ \cos[(\pi/2L)(x-ct)]\}\ [(\pi\ c)/(2L)]\ u_o\ \cos\ [(\pi/2L)(x-tc)]; \quad (8)$$
$$= (\pi/2L)^2\ c\ u_o^2\ \{\cos\ [(\pi/2L)(x-ct)]\}^2$$
$$= \sigma^2/\rho c$$

The power S (per unit cross section area (watts/$m^2$)), is delivered for [(2L)/c] seconds through each fixed location as it propagates through that location. Thus, the total energy W in the wave packet is found by integrating the power over the time interval [(2L)/c]: i.e., during the time that the power S is flowing by a fixed location x on the drill rod 4.

Thus, the total wave energy W passing by an observation point x is:

$$W = \langle S\rangle\ (2L/c)\ A \quad (9)$$
$$= (1/2)\ A\ u_o^2\ E\ (\pi/2L)^2\ 2L,$$

where <S> is the time average of the power S over the time interval (2L/c).

The wave energy W is equal to the original kinetic energy ($W_h$) in the initiating hammer-blow, wherein $W_h$ is given above at equation (4) as being equal to $W_h=(1/2)mv^2$. From equation (4), the kinetic energy ($W_h$) may be expressed as:

$$W_h=(1/2)\rho A L v^2 \quad (10)$$

Where m is the mass of the hammer 2-6, ρ is the mass density of steel (about $8\times10^3$ kg/$m^3$), ν is the hammer velocity, A is the cross-section area of the hammer 2-6 (and drill rod 4), and L is the length of the hammer 2-6.

Equating the hammer energy $W_h$ (equation 10) to the wave energy (equation 9) gives a solution for $u_o$:

$$u_o=(2L/\pi)(\nu/c) \quad (11)$$

Note that $u_o$ is a relatively small displacement of one of the discrete drill rod elements referred to above during the discussion of the model parameters. Each of the other elements of equation (11) was described above.

Of course, the displacement $u_o$ may be substituted into some of the equations provided above to ascertain other properties of the propagating energy packet. Accordingly, the equation for the displacement $u_o$ in equation (11) may be substituted into equation (6) to obtain $$\sigma = [(2L/\pi)(v/c)]\ \{E\ (\pi/2L)\ u_o\ \cos[(\pi/2L)(x-ct)]\} \quad (12)$$
$$= E\ (v/c)\ \cos[(\pi/2L)(x-ct)],$$

The peak stress $\sigma_0$ occurs when x=ct; and thus the peak pressure $\sigma_0$ is simply the product of Young's modulus E, and the ratio of the hammer velocity v and the velocity of sound c in steel:

$$\sigma_0=E(\nu/c) \quad (13)$$

The equation for the wave velocity (du dt) is given by equation (7) above as [(πc)/(2L)] $u_o$ cos [(π/2L)(x−ct)]. The expression for displacement $u_o$ may be substituted into equation (7) to provide:

$$du/dt=[(\pi c)/(2L)]u_o\ \cos\ [(\pi/2L)(x-ct)]$$

$$(2L/\pi)(\nu/c)[(\pi c)/(2L)]\ \cos[(\pi/2L)(x-ct)]$$

$$\nu\ \cos[(\pi/2L)(x-ct)] \quad (14)$$

Note that the sound wave displacement velocity du/dt is equal to the velocity of the hammer (ν) immediately prior to the hammer's initial impact.

Considering the above analysis, some numerical examples are provided to illustrate some of the implications of the analysis to drilling and/or mining operations. Consider an example wherein the hammer has the following physical parameters: an 8 kg mass, 0.35 m in length; and a 60 mm diameter. (Of course, the drill rod 4 would also include a 60 mm diameter in accordance with the modeling provided above). Moreover, the example further stipulates that the hammer percussion velocity ν is about 10 m/s. With these values, the original kinetic energy ($W_h$) would be about 400 joules per hammer blow, the displacement $u_o$ would be about 1.5 mm and the velocity ν, i.e., du/dt, would be 33 ft./sec or about 10 m/s. The strain (ε), which equals du/dx, would be in a range of values between 0.001 and 0.0015. The stress (σ), which as shown above equals E·ε, would be in the range between 50-60,000 psi. Finally, the power <S>A is about 5,300 kW.

As noted above, the downhole housing 12 is configured to slide along the source-carrying region 4-8 between the two shoulders (4-2, 4-4) in a substantially frictionless manner such that the stress wave and power flow are substantially not transmitted to housing 12. Moreover, the pneumatic isolator portions 12-5 provide a pressurized and self-correcting air spring that substantially protects the housing 12 from any remaining portion of the stress wave and power flow that may be incident housing 12. Also, the pneumatic isolator portions 12-5 at each end of the housing 12 provides cooling to housing 12 and substantially prevents dirt and debris from entering and occluding the frictionless interface (between housing 12 and region 4-8).

Figure 11:
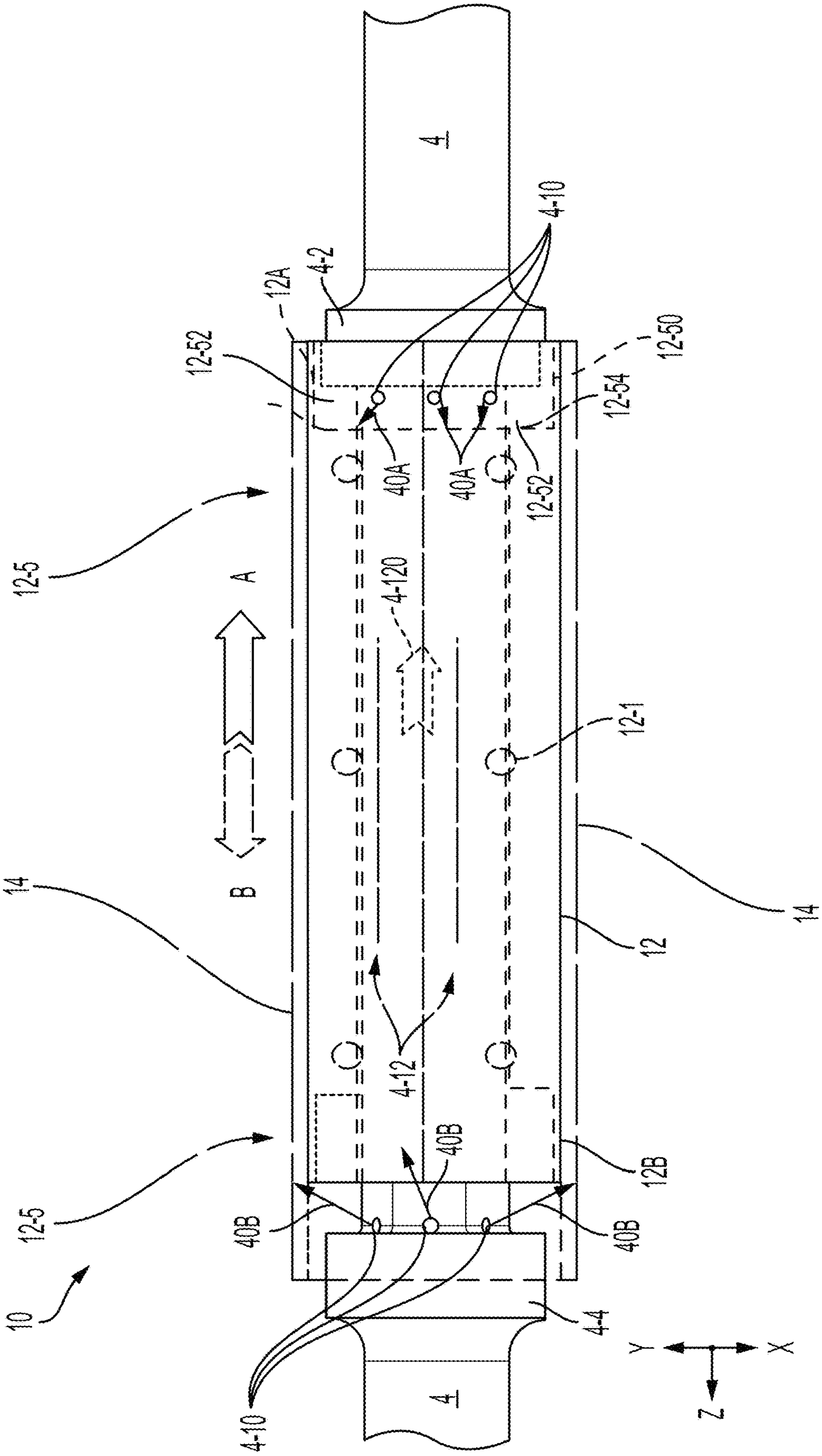
FIG. 11 is a diagrammatic depiction illustrating operational states of the apparatus depicted at FIG. 3 in response to a relatively high shock event.

As embodied herein and depicted in FIG. 11, a diagrammatic depiction illustrating the operation of the apparatus 10 in response to a relatively high axial shock event is disclosed. Specifically, FIG. 11 illustrates how the pneumatic isolators 12-5 self-correct in response to a stress wave that disrupts an equilibrium state. Before describing the operations, note that the down hole housing 12 moves in response to a fluid-flow 4-120 directed through the central fluid-flow via 4-12. In one embodiment, the fluid may be air that is forced through the central fluid-flow via 4-12 at about 150 psi, at a volume/rate of about eight cubic meters per minute (8.0 $m^3$/min).

In this view; the housing 12 has been momentarily positioned by the stress wave in position A, which extends over the shoulder 4-2 such that the gap between the housing 12 and the drill rod shoulder 4-2 is substantially closed. Accordingly, the air-flow 40A that is expelled from the fluid channels 4-10 (proximate shoulder 4-2) is directed against the piston abutment wall 12-54 to drive the housing 12 back toward shoulder 4-4 (and position B). At the opposite end of housing 12, the air-flow 40B is expelled through the fluid channels 4-10 (proximate shoulder 4-4) and the air pressure within this pneumatic isolator 12-5 (proximate shoulder 4-4) is substantially decreased. On the other hand, the air-flow 40B acts to cool the housing 12 and substantially remove any debris from becoming lodged in the gap between the drill rod shoulder 4-4 and the rim 12-50. Note that the pneumatic isolator portion 12-5 and the shoulder 4-2 typically do not come into contact: i.e., an air gap is typically maintained therebetween. Air gaps are also typically maintained between the carrying portion 4-8 and the registration portion 12-56 to facilitate a self-correcting sliding motion between position A and position B.

In similar fashion, once the gap between the pneumatic isolator portion 12-5 and the drill rod shoulder 4-2 begins to open (due to the self-regulating action of the pneumatic isolator 12-5), the air-flow 40A that is expelled from the fluid channels 4-10 (proximate shoulder 4-2) is expelled outwardly, and this action cools the housing 12 and substantially prevents debris from becoming lodged in the gap between the drill rod shoulder 4-2 and the housing 12. At the other end of the housing 12, the gap between the housing and the drill rod shoulder 4-4 begins to narrow so that the air-flow 40B is directed from the fluid channels 4-10 against the piston abutment wall 12-54 proximate shoulder 4-4. At this point, the housing 12 is driven back toward shoulder 4-2 and position A. Again, note that the pneumatic isolator portion 12-5 and the shoulder 4-4 typically do not come into contact: an air gap is typically maintained therebetween. At this point, the pneumatic isolators 12-5 at each end of the housing 12 will continue to self-regulate until the housing 12 finds an equilibrium position.

Figure 12:
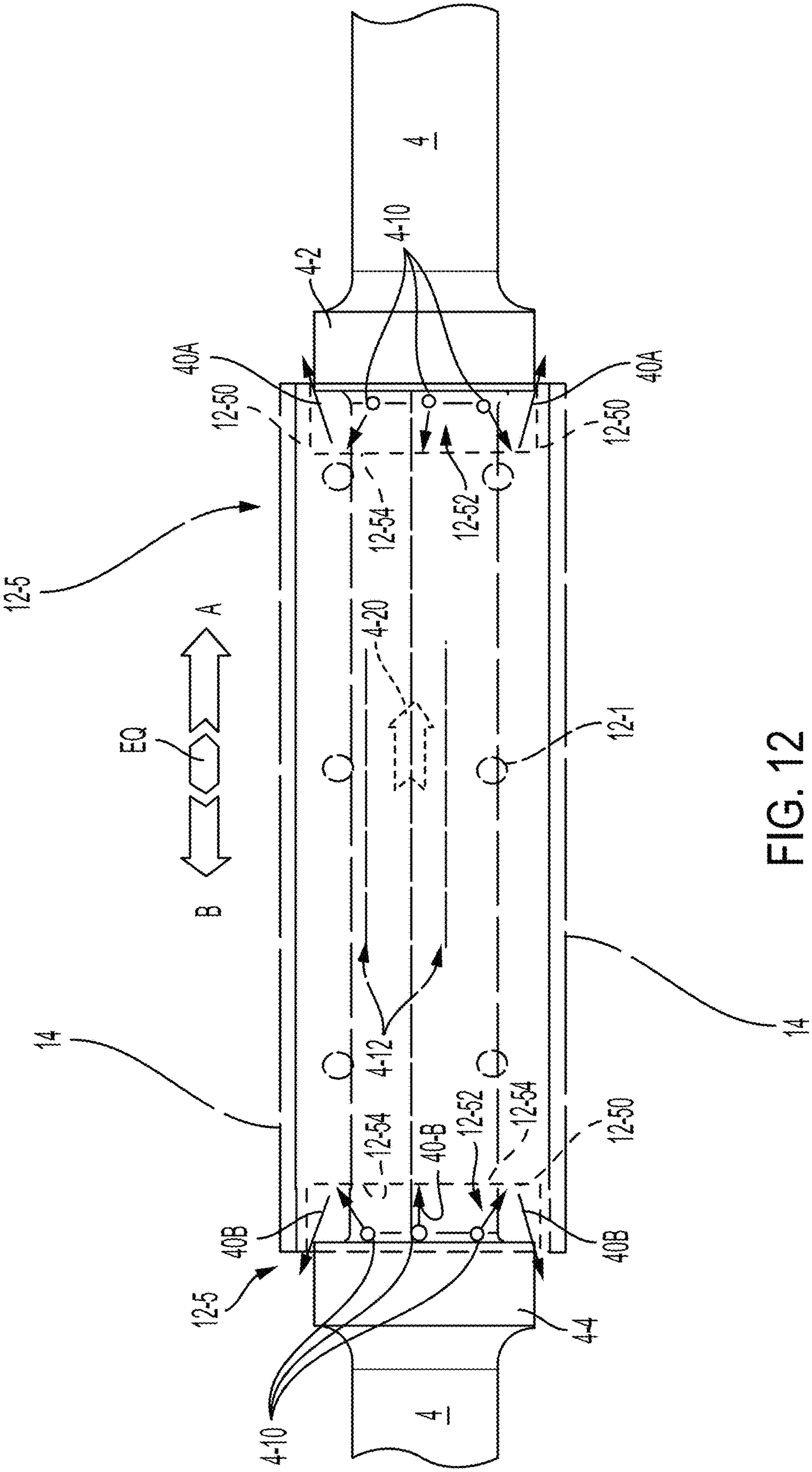
FIG. 12 is a diagrammatic depiction illustrating operational states of the apparatus depicted at FIG. 3 in response in an equilibrium state.

As embodied herein and depicted in FIG. 12, a diagrammatic depiction illustrating the operation of the apparatus in an equilibrium state is disclosed. In the equilibrium state, a series of stress waves may propagate down the drill rod 4 in response to operational stimuli. The pneumatic isolators 12-5 formed at each end of the housing 12 employ pressurized air chambers 12-52 that facilitate the equilibrium state. In the equilibrium state, the rim portion 12-50 at each end (A, B) overlaps its respective shoulder (4-2, 4-4) by a relatively small distance. Thus, there is a small amount of fluid (air) leakage from the fluid (air) vias 4-10 disposed inside each air chambers 12-52. Thus, each pneumatic isolator chamber 12-52 is pressurized at a substantial fraction of the pressure of the fluid flowing in the drill rod. By way of example, each chamber may be pressurized at a substantial fraction of a 150 psi air stream 4-20 flowing in the center drill rod via 4-12; i.e., a pressure a little less than 75 PSI. The air supply channels 4-10 on the drill rod region 4-8 are appropriately sized to direct an air flow amount into the chamber 12-52 that is substantially the same air flow amount that leaks from the gap between each rim portion 12-50 and its respective shoulder (4-2, 4-4).

Accordingly, when the housing 12 slides slightly toward position A, a relatively small gap may be formed between the drill rod shoulder 4-4 and its respective rim 12-50) (i.e., at position B) and the gap will result in an increase in air leakage and a drop in air pressure in the chamber 12-52 (at position B). In the pneumatic isolator chamber 12-52 at the opposite end proximate shoulder 4-2 (position A), there is a decrease in air leakage and an increase in the air pressure: as such, the increased air pressure causes the housing 12 to slide in the opposite direction to close the gap and equalize the air pressure. If the housing 12 slides slightly toward position B, a similar process occurs to maintain the self-correcting equilibrium. Again, in this example, each air chamber 12-52 is supplied with up to about 75 psi of air pressure to maintain an equilibrium state, and thus implements a pneumatic spring that is not subject to fatigue or failure at connection points and/or concentrated points of intense acceleration.

In summary, the housing 12 operates in a self-correcting manner to reciprocate (in a frictionless manner) between drill-rod shoulder 4-2 (position A) and drill-rod shoulder 4-4 (position B) at a relatively high rate. In doing so, the pneumatic isolator portion 12-5 at each end of the housing 12 alternate between a first (drive) mode and a second (cooling and debris removal) mode. The present invention substantially prevents thermal energy, stress wave and vibrational forces (e.g., from drilling and/or hammer-drilling) from being transmitted from the drill rod 4 to the housing 12 by virtue of the air (fluid) gap that is maintained between the drill rod 4 and housing 12. Those skilled in the art will appreciate that F=ma: i.e., force equals mass times acceleration. In this case, when a drill bit is hammered against a rock wall (see, e.g., FIG. 2), the force is reflected and a shock wave is transmitted by the steel mass toward the housing 12. Once the force is incident the steel-air (fluid) boundary that characterizes the interface between the housing 12 and the drill 4, the magnitude of the force drops precipitously because the mass of the air (fluid) is orders of magnitude lower than the mass of the steel.

With regard to transmitting thermal energy, a similar principle is at play. Specifically, steel is an excellent conductor of heat whereas air (fluid) functions as an insulator that does not readily conduct heat from the steel rod 4 to the housing 12. Moreover, the heat is further prevented from being transmitted from the drill rod 4 to the housing 12 by the cooling action of the fluid channels 4-10 (as described previously).

Note also that while the housing moves about the drill rod 4 in the manner thus described, the drill rod 4 is typically rotating and/or reciprocating due to drive forces applied at the drive box 4-6 (FIG. 3). Despite this drill rod motion, the housing 12 maintains rotational registration to the drill rod 4 such that a rotational position of a tool face (coupled to the drill rod pin 4-1) may be ascertained at all times (as a function of the rotational position of the magnets 100).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto: inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including." and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B): in another embodiment, to at least one, optionally including more than one, B, with no A present (and optionally including elements other than A); in yet another embodiment, to at least one, optionally including more than one, A, and at least one, optionally including more than one, B (and optionally including other elements): etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged: such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An apparatus for use on a structural member having a longitudinal axis, the structural member being configured to conduct a pressurized fluid in an operational state, the apparatus comprising:

a housing member including a first end, a second end, and at least one protective enclosure configured to accommodate at least one device, wherein the housing member is configured to move on the structural member parallel to the longitudinal axis in the operational state with a substantially frictionless reciprocating motion, wherein the housing member is configured to be rotationally registered to the structural member;

a first pneumatic isolator formed at the first end and configured to receive a first pressurized fluid portion of the pressurized fluid in the operational state to thus drive the housing member toward a second direction of the substantially frictionless reciprocating motion; and a second pneumatic isolator formed at the second end and configured to receive a second pressurized fluid portion of the pressurized fluid in the operational state to thus drive the housing member toward a first direction of the substantially frictionless reciprocating motion opposite the second direction, wherein the substantially frictionless reciprocating motion is a function of external stimuli, the first pressurized fluid portion and the second pressurized fluid portion such that the housing member is substantially isolated from the external stimuli.

2. The apparatus of claim 1, wherein the at least one device includes at least one sensor device or at least one magnetic source element.

3. The apparatus of claim 2, wherein the at least one sensor device includes at least one accelerometer, at least one magnetometer, a gyro sensor, a piezoelectric transducer, or a battery device.

4. The apparatus of claim 1, wherein the at least one protective enclosure includes at least one set of pockets orientated in a plane perpendicular to the longitudinal axis, and wherein each pocket of the at least one set of pockets is configured to accommodate a magnetic source element.

5. The apparatus of claim 1, wherein the pressurized fluid is a gas or a liquid.

6. The apparatus of claim 1, wherein the structural member is a drill rod or a drill rod attachment.

7. The apparatus of claim 1, wherein the external stress stimuli include stress waves, vibrations or thermal energy applied to the structural member.

8. The apparatus of claim 1, wherein the pressurized fluid has a predetermined fluid pressure, the first pressurized fluid portion has a first variable fluid pressure, and the second pressurized fluid portion has a second variable fluid pressure, a sum of the first variable fluid pressure and the second variable fluid pressure being approximately equal to the predetermined fluid pressure.

9. An assembly comprising:

a structural member having a longitudinal axis and configured to conduct a pressurized fluid in an operational state; and an apparatus comprising, a housing member including a first end, a second end, and at least one protective enclosure configured to accommodate at least one device, wherein the housing member is configured to move on the structural member parallel to the longitudinal axis in the operational state with a substantially frictionless reciprocating motion, wherein the housing member is rotationally registered to the structural member;

a first pneumatic isolator formed at the first end, a first pressurized fluid portion of the pressurized fluid being applied to the first pneumatic isolator in the operational state to drive the housing member toward a second direction of the reciprocating motion, and a second pneumatic isolator formed at the second end, a second pressurized fluid portion of the pressurized fluid being applied to the second pneumatic isolator in the operational state to drive the housing member toward a first direction of the reciprocating motion opposite the second direction, wherein the substantially frictionless reciprocating motion is a function of external stimuli, the first pressurized fluid portion, and the second pressurized fluid portion, wherein the housing member is substantially isolated from the external stimuli.

10. The assembly of claim 9, wherein the structural member includes a carrying region, a first shoulder member disposed at a first end portion of the carrying region and a second shoulder member disposed at a second end portion of the carrying region, wherein the housing member is coupled to the carrying region between the first shoulder member and the second shoulder member.

11. The assembly of claim 10, wherein the structural member further comprises a box portion disposed at a first end of the structural member, a pin portion disposed at a second end of the structural member, and a carrying region being disposed between the box portion and the pin portion, the box portion being configured to accommodate a drive element of a drill string and the pin portion being configured to accommodate a tool bit or a drill bit.

12. The assembly of claim 9, wherein the structural member includes a first plurality of openings configured to provide the first pressurized fluid portion and a second plurality of openings configured to provide a second pressurized fluid portion.

13. The assembly of claim 12, wherein the first plurality of openings are configured to direct the first pressurized fluid portion into the first pneumatic isolator and the second plurality of openings are configured to direct the second pressurized fluid portion into the second first pneumatic isolator.

14. The apparatus of claim 9, wherein the at least one device includes at least one sensor device or at least one magnetic source element.

15. The apparatus of claim 14, wherein the at least one sensor device includes at least one accelerometer, at least one magnetometer, a gyro sensor, a piezoelectric transducer, or a battery device.

16. The apparatus of claim 9, wherein the at least one protective enclosure includes at least one set of pockets orientated in a plane perpendicular to the longitudinal axis, and wherein each pocket of the at least one set of pockets is configured to accommodate a magnetic source element.

17. The apparatus of claim 9, wherein the pressurized fluid is a gas or a liquid.

18. The apparatus of claim 9, wherein the structural member is a drill rod or a drill rod attachment.

19. The apparatus of claim 9, wherein the external stress stimuli include stress waves, vibrations or thermal energy applied to the structural member.

20. The apparatus of claim 9, wherein the pressurized fluid has a predetermined fluid pressure, the first pressurized fluid portion has a first variable fluid pressure, and the second pressurized fluid portion has a second variable fluid pressure, a sum of the first variable fluid pressure and the second variable fluid pressure being approximately equal to the predetermined fluid pressure.

21. A method comprising:

providing a structural member having a longitudinal axis;

providing an apparatus comprising a housing member including a first end, a second end, and at least one protective enclosure configured to accommodate at least one device, wherein the housing member further includes a first pneumatic isolator formed at the first end and a second pneumatic isolator formed at the second end;

coupling the housing member to the structural member such that the housing member is rotationally registered to the structural member, wherein the housing member is configured to move on the structural member parallel to the longitudinal axis in the operational state with a substantially frictionless reciprocating motion;

entering an operational state wherein a pressurized fluid is conducted through the structural member;

applying a first pressurized fluid portion of the pressurized fluid to the first pneumatic isolator to drive the housing member toward a second direction of the substantially frictionless reciprocating motion;

applying a second pressurized fluid portion of the pressurized fluid to the second pneumatic isolator to drive the housing member toward a first direction of the substantially frictionless reciprocating motion opposite the second direction; and wherein the substantially frictionless reciprocating motion is a function of the first pressurized fluid portion, the second pressurized fluid portion and external stimuli such that the housing member is substantially isolated from the external stimuli.

22. The method of claim 21, wherein the pressurized fluid is a gas or a liquid.

23. The method of claim 21, wherein the pressurized fluid has a predetermined fluid pressure, the first pressurized fluid portion has a first variable fluid pressure, and the second pressurized fluid portion has a second variable fluid pressure, a sum of the first variable fluid pressure and the second variable fluid pressure being approximately equal to the predetermined fluid pressure.

24. The method of claim 21, wherein the external stress stimuli include stress waves, vibrations or thermal energy applied to the structural member.

25. The method of claim 21, wherein the at least one device includes at least one sensor device or at least one magnetic source element, wherein the at least one sensor device includes at least one accelerometer, at least one magnetometer, a gyro sensor, a piezoelectric transducer, or a battery device.

* * * * *